US010531395B2

(12) United States Patent
Sun et al.

(10) Patent No.: US 10,531,395 B2
(45) Date of Patent: Jan. 7, 2020

(54) UPLINK POWER CONTROL METHOD AND APPARATUS

(71) Applicant: HUAWEI TECHNOLOGIES CO., LTD., Shenzhen, Guangdong (CN)

(72) Inventors: Hao Sun, Beijing (CN); Xu Zhang, Beijing (CN); Yan Cheng, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/031,918

(22) Filed: Jul. 10, 2018

(65) Prior Publication Data

US 2018/0324707 A1 Nov. 8, 2018

Related U.S. Application Data

(63) Continuation of application No. PCT/CN2016/106414, filed on Nov. 18, 2016.

(30) Foreign Application Priority Data

Jan. 27, 2016 (CN) .......................... 2016 1 0054967

(51) Int. Cl.
*H04W 52/14* (2009.01)
*H04W 52/04* (2009.01)
*H04W 52/58* (2009.01)
*H04W 52/28* (2009.01)
(Continued)

(52) U.S. Cl.
CPC ......... *H04W 52/146* (2013.01); *H04L 1/1812* (2013.01); *H04W 52/04* (2013.01);
(Continued)

(58) Field of Classification Search
CPC ... H04W 52/146; H04W 52/04; H04W 52/14; H04L 1/1816
(Continued)

(56) References Cited

U.S. PATENT DOCUMENTS

2012/0236767 A1 9/2012 Zhu et al.
2013/0022012 A1 1/2013 Lee et al.
(Continued)

FOREIGN PATENT DOCUMENTS

CN 101720122 A 6/2010
CN 104040928 A 9/2014
(Continued)

*Primary Examiner* — John J Lee
(74) *Attorney, Agent, or Firm* — Womble Bond Dickinson (US) LLP

(57) ABSTRACT

Embodiments of the present disclosure provide an uplink power control method, includes: determining, by a base station, power control information, where the power control information is used to control a power of a UE; sending, by the base station, hybrid automatic repeat request (HARQ) acknowledgment feedback information to X UEs, where the HARQ acknowledgment feedback information carries the power control information of at least one of the X UEs, the X UEs contend for use of a same transmission resource, and X is an integer greater than or equal to 1; receiving, by the UE, acknowledgment feedback information sent by the base station to the X UEs; and parsing the HARQ acknowledgment feedback information; and if it is determined that the HARQ acknowledgment feedback information includes the power control information of the UE, performing power control on the user equipment based on the power control information of the UE.

20 Claims, 12 Drawing Sheets

(51) Int. Cl.
  *H04W 52/48*  (2009.01)
  *H04L 1/18*  (2006.01)
  *H04W 52/38*  (2009.01)
  *H04W 74/08*  (2009.01)
  *H04W 52/20*  (2009.01)
(52) U.S. Cl.
  CPC ......... *H04W 52/14* (2013.01); *H04W 52/286* (2013.01); *H04W 52/386* (2013.01); *H04W 52/48* (2013.01); *H04W 52/58* (2013.01); *H04W 74/08* (2013.01); *H04W 52/20* (2013.01)
(58) Field of Classification Search
  USPC ........ 455/522, 69, 542.1, 509, 67.11, 452.1; 370/329, 280
  See application file for complete search history.

(56) References Cited

U.S. PATENT DOCUMENTS

| | | | |
|---|---|---|---|
| 2013/0176864 A1 | 7/2013 | Quan et al. | |
| 2014/0029532 A1* | 1/2014 | Han | H04W 72/0413 370/329 |
| 2015/0173065 A1* | 6/2015 | Fu | H04L 1/1861 370/280 |
| 2018/0145796 A1* | 5/2018 | Liang | H04L 1/1812 |

FOREIGN PATENT DOCUMENTS

| | | | |
|---|---|---|---|
| CN | 104202821 A | 12/2014 | |
| WO | 2015122737 A1 | 8/2015 | |

\* cited by examiner

UPLINK POWER CONTROL METHOD AND APPARATUS

CROSS-REFERENCE TO RELATED APPLICATIONS

This application is a continuation of International Application No. PCT/CN2016/106414, filed on Nov. 18, 2016, which claims priority to Chinese Patent Application No. 201610054967.7, filed on Jan. 27, 2016. The disclosures of the aforementioned applications are hereby incorporated by reference in their entireties.

TECHNICAL FIELD

The present disclosure relates to the field of communications technologies, and in particular, to an uplink power control method and an apparatus.

BACKGROUND

In a Long Term Evolution (LTE) system, uplink/downlink data scheduling between a base station (eNB, eNodeB) and user equipment (UE) is implemented in a one-to-one scheduling manner by using a physical downlink control channel (PDCCH) or an enhanced physical downlink control channel E-PDCCH. However, as a quantity of UEs, and a quantity of UEs concurrently accessing a same eNB continuously increase, a huge challenge to capacity of a physical downlink control channel used for data scheduling is generated.

In the current LTE system, a method for optimizing overheads of a control channel includes an uplink contention transmission solution based on group scheduling. The group scheduling is to determine a plurality of user equipments served by a same carrier unit as user equipments in a same resource group, and the plurality of user equipments in the same resource group correspond to one contention based uplink grant (CB-grant) scheduling instruction. In the solution, an eNB schedules uplink transmission of the plurality of UEs in the same contention transmission resource group by using a CB-grant, and distinguishes data of the UEs by using demodulation reference signals of the UEs. In this way, scheduling overheads of the UEs are reduced.

However, although an uplink contention transmission manner based on group scheduling can effectively alleviate an overhead problem of the control channel, when a PDCCH signaling format 0/4 is used for the scheduling instruction, power control of the plurality of user equipments served by the same carrier unit cannot be configured. If a PDCCH signaling format 3/3a is used for the scheduling instruction to configure power control based on a user in a contention area, complexity of blind detection on the user in the contention area is increased, and overheads of control signaling are also increased.

SUMMARY

Embodiments of the present disclosure provide an uplink power control method, an apparatus, and a communications system, to resolve a problem in the prior art that uplink closed-loop power control cannot be implemented in a group scheduling manner.

The following technical solutions are used in the embodiments of the present disclosure to achieve the foregoing objective.

According to a first aspect, an uplink power control method is provided, applied to a base station. The method includes:

determining, by the base station, power control information, where the power control information is used to control a power of user equipment; and sending, by the base station, hybrid automatic repeat request (HARQ) acknowledgment feedback information to X user equipments, where the HARQ acknowledgment feedback information carries the power control information of at least one of the X user equipments, the X user equipments contend for use of a same transmission resource, and X is an integer greater than or equal to 1.

That is, if the base station determines that power control is intended to be performed on at least one of X user equipments, the base station adds power control information of the at least one of the X user equipments to HARQ acknowledgment feedback information, and sends the HARQ acknowledgment feedback information to the X user equipments.

With reference to the first aspect, in a first possible implementation of the first aspect, the sending, by the base station, HARQ acknowledgment feedback information to X user equipments includes:

sending, by the base station, HARQ acknowledgment feedback information in a first format to the X user equipments, where the HARQ acknowledgment feedback information in the first format includes a first acknowledgment feedback field and a power control field, the power control field includes N power control subfields, the N power control subfields carry power control information of S user equipments, and one power control subfield is used to carry power control information of one user equipment at most; and the first acknowledgment feedback field includes index information of M user equipments, the index information of the M user equipments is used to indicate a correspondence between the N power control subfields and the power control information of the S user equipments, and $1 \leq S \leq N \leq M$.

With reference to the first aspect, in a second possible implementation of the first aspect, the sending, by the base station, HARQ acknowledgment feedback information to X user equipments includes:

sending, by the base station, HARQ acknowledgment feedback information in a second format to the X user equipments, where the acknowledgment feedback information in the second format includes L subfields, and includes a first field, a special acknowledgment field, and a second field, the special acknowledgment field includes T subfields, and invalid information is in the special acknowledgment field; the second field includes N power control subfields, the N power control subfields carry power control information of S user equipments, and one power control subfield is used to carry power control information of one user equipment at most; and the first field includes W subfields, the W subfields carry index information of M user equipments, the index information of the M user equipments is used to indicate a correspondence between the power control subfields and the power control information of the S user equipments, $1 \leq S \leq N \leq W$, $1 \leq S \leq M \leq W$, and $L = N + T + W$.

With reference to the first possible implementation of the first aspect or the second possible implementation of the first aspect, in a third possible implementation of the first aspect, that the index information of the M user equipments is used to indicate the correspondence between the power control subfields and the power control information of the S user equipments is:

the power control information of the S user equipments is sequentially arranged in a first order along a preset direction of the N power control subfields starting from the first power control subfield in the preset direction, where the first order is the same as or opposite to an arrangement order of a first sequence constituted by pieces of index information that instruct to carry power control information of corresponding user equipments in the preset direction and that are among M pieces of index information.

With reference to the third possible implementation of the first aspect, in a fourth possible implementation of the first aspect, when N is equal to S, the N power control subfields carry power control information of N user equipments; or when N is greater than S, the N power control subfields carry the power control information of the S user equipments, and N−S power control subfields are filled with invalid information.

With reference to the first possible implementation of the first aspect, in a fifth possible implementation of the first aspect, before the sending, by the base station, HARQ acknowledgment feedback information to X user equipments, the method further includes:

sending, by the base station, scheduling signaling to the X user equipments, where the scheduling signaling is used to indicate a format of the HARQ acknowledgment feedback information.

With reference to the fifth possible implementation of the first aspect, in a sixth possible implementation of the first aspect, the scheduling signaling includes a preset indication bit, and the format of the HARQ acknowledgment feedback information is indicated by using the preset indication bit; or the scheduling signaling is scrambled by using different preset scrambling codes, and the different preset scrambling codes correspond to formats of the HARQ acknowledgment feedback information.

With reference to the sixth possible implementation of the first aspect, in a seventh possible implementation of the first aspect, the method further includes:

if the scheduling signaling includes a preset indication bit, sending, by the base station when the preset indication bit is a first value, HARQ acknowledgment feedback information in a third format to the X user equipments, where the HARQ acknowledgment feedback information in the third format includes a second acknowledgment feedback field; or if the scheduling signaling is scrambled by using different preset scrambling codes, sending, by the base station when a preset scrambling code is a first scrambling code, HARQ acknowledgment feedback information in a third format to the X user equipments, where the HARQ acknowledgment feedback information in the third format includes a second acknowledgment feedback field.

With reference to the first possible implementation of the first aspect, in an eighth possible implementation of the first aspect, the method further includes:

sending, by the base station, first configuration signaling to the X user equipments, where the first configuration signaling includes a subfield quantity of the power control field of the HARQ acknowledgment feedback information in the first format.

With reference to the second possible implementation of the first aspect, in a ninth possible implementation of the first aspect, the method further includes:

when valid information is in the special acknowledgment field, sending, by the base station, the HARQ acknowledgment feedback information in the second format to the X user equipments, where the N power control subfields do not carry power control information of user equipment.

With reference to the second possible implementation of the first aspect, in a tenth possible implementation of the first aspect, the method further includes:

sending, by the base station, second configuration signaling to the X user equipments, where the second configuration signaling includes location information of the special acknowledgment field.

According to a second aspect, an uplink power control method is provided, applied to user equipment. The method includes:

receiving HARQ acknowledgment feedback information sent by a base station to X user equipments, where the HARQ acknowledgment feedback information carries power control information of at least one of the X user equipments, the X user equipments contend for use of a same transmission resource, and X is an integer greater than or equal to 1; and parsing the HARQ acknowledgment feedback information; and if it is determined that the HARQ acknowledgment feedback information includes the power control information of the user equipment, performing power control on the user equipment based on the power control information of the user equipment.

With reference to the second aspect, in a first possible implementation of the second aspect, the receiving HARQ acknowledgment feedback information sent by a base station to X user equipments includes:

receiving HARQ acknowledgment feedback information in a first format sent by the base station to the X user equipments, where the HARQ acknowledgment feedback information in the first format includes a first acknowledgment feedback field and a power control field, the power control field includes N power control subfields, the N power control subfields carry power control information of S user equipments, and one power control subfield is used to carry power control information of one user equipment at most; and the first acknowledgment feedback field includes index information of M user equipments, the index information of the M user equipments is used to indicate a correspondence between the power control subfields and the power control information of the S user equipments, and $1 \leq S \leq N \leq M$; and correspondingly, the parsing the HARQ acknowledgment feedback information includes:

querying index information corresponding to the user equipment from the index information of the M user equipments included in the first acknowledgment feedback field; and determining, based on the index information corresponding to the user equipment, and the correspondence that is between the power control subfields and the power control information of the S user equipments and that is indicated by the index information of the M user equipments, whether the power control subfields include the power control information of the user equipment.

With reference to the second aspect, in a second possible implementation of the second aspect, the receiving HARQ acknowledgment feedback information sent by a base station to X user equipments includes:

receiving HARQ acknowledgment feedback information in a second format sent by the base station to the X user equipments, where the HARQ acknowledgment feedback information in the second format includes L subfields, and includes a first field, a special acknowledgment field, and a second field, the special acknowledgment field includes T subfields, and invalid information is in the special acknowledgment field; the second field includes N power control subfields, the N power control subfields carry power control information of S user equipments, and one power control subfield is used to carry power control information of one user equipment at most; and the first field includes W subfields, the W subfields carry index information of M user equipments, the index information of the M user equipments is used to indicate a correspondence between the power control subfields and the power control information of the S user equipments, $1 \leq S \leq N \leq W$, $1 \leq S \leq M \leq W$, and $L=N+T+W$; and correspondingly, the parsing the HARQ acknowledgment feedback information includes:

determining whether the first field includes the index information of the user equipment; and if it is determined that the first field includes the index information of the user equipment and it is determined that the invalid information is in the special acknowledgment field, determining, based on the index information corresponding to the user equipment, and the correspondence that is between the power control subfields and the power control information of the S user equipments and that is indicated by the index information of the M user equipments, whether the power control subfields include the power control information of the user equipment.

With reference to the first possible implementation of the second aspect or the second possible implementation of the second aspect, in a third possible implementation of the second aspect, that the index information of the M user equipments is used to indicate the correspondence between the power control subfields and the power control information of the S user equipments is: the power control information of the S user equipments is sequentially arranged in a first order along a preset direction of the N power control subfields starting from the first power control subfield in the preset direction, where the first order is the same as or opposite to an arrangement order of a first sequence constituted by pieces of index information that instruct to carry power control information of corresponding user equipments in the preset direction and that are among M pieces of index information; and correspondingly, the determining, based on the index information corresponding to the user equipment, and the correspondence that is between the power control subfields and the power control information of the S user equipments and that is indicated by the index information of the M user equipments, whether the power control subfields include the power control information of the user equipment includes:

if the index information corresponding to the user equipment indicates that the power control subfields carry the power control information of the user equipment, sequentially arranging all of the pieces of index information that instruct to carry power control information of corresponding user equipments and that are of the M pieces of index information along the preset direction to generate the first sequence;

determining a sequence number i of the index information of the user equipment in the first sequence, where $1 \leq i \leq M$; and if the first order is the same as the arrangement order of the first sequence, determining that the $i^{th}$ piece of power control information starting from the first power control subfield in the preset direction is the power control information of the user equipment; or if the first order is opposite to the arrangement order of the first sequence, determining that the $i^{th}$ piece of power control information starting from the last power control subfield in the preset direction is the power control information of the user equipment.

With reference to the first possible implementation of the second aspect, in a fourth possible implementation of the second aspect, before the receiving HARQ acknowledgment feedback information sent by a base station to X user equipments, the method further includes:

receiving scheduling signaling sent by the base station to the X user equipments, where the scheduling signaling is used to indicate a format of the HARQ acknowledgment feedback information; and correspondingly, before the parsing the HARQ acknowledgment feedback information, the method further includes:

determining the format of the HARQ acknowledgment feedback information based on the scheduling signaling.

With reference to the fourth possible implementation of the second aspect, in a fifth possible implementation of the second aspect, the scheduling signaling includes a preset indication bit, and the format of the HARQ acknowledgment feedback information is indicated by using the preset indication bit; and correspondingly, the determining the format of the HARQ acknowledgment feedback information based on the scheduling signaling includes: when the preset indication bit is a first value, determining that the format of the HARQ acknowledgment feedback information is a third format, or when the preset indication bit is a second value, determining that the format of the HARQ acknowledgment feedback information is the first format; or the scheduling signaling is scrambled by using different preset scrambling codes, and the different preset scrambling codes correspond to formats of the HARQ acknowledgment feedback information; and correspondingly, the determining the format of the HARQ acknowledgment feedback information based on the scheduling signaling includes: if a preset scrambling code is a first scrambling code, determining that the format of the HARQ acknowledgment feedback information is a third format, or if a preset scrambling code is a second scrambling code, determining that the format of the HARQ acknowledgment feedback information is the first format.

With reference to the fifth possible implementation of the second aspect, in a sixth possible implementation of the second aspect, the method further includes:

receiving the HARQ acknowledgment feedback information in the third format sent by the base station to the X user equipments, where the HARQ acknowledgment feedback information in the third format includes a second acknowledgment feedback field.

With reference to the first possible implementation of the second aspect, in a seventh possible implementation of the second aspect, the method further includes:

receiving first configuration signaling sent by the base station to the X user equipments, where the first configuration signaling includes a subfield quantity of power control field; and correspondingly, after the receiving HARQ acknowledgment feedback information in a first format sent by the base station to the X user equipments, the method further includes:

determining a length of the HARQ acknowledgment feedback information in the first format based on the subfield quantity of the power control field.

With reference to the second possible implementation of the second aspect, in an eighth possible implementation of the second aspect, the method further includes:

receiving HARQ acknowledgment feedback information in a second format sent by the base station to the X user equipments, where the N power control subfields do not carry power control information of user equipment.

With reference to the second possible implementation of the second aspect, in a ninth possible implementation of the second aspect, the method further includes:

receiving second configuration signaling sent by the base station to the X user equipments, where the second configuration signaling includes location information of the special acknowledgment field; and correspondingly, the determining that invalid information is in the special acknowledgment field includes:

determining a target location of the special acknowledgment field in the acknowledgment feedback information based on the location information of the special acknowledgment field, and if information on the target location is invalid information, determining that the invalid information is in the special acknowledgment field.

According to a third aspect, a base station is provided. The base station includes:

a determining unit, configured to determine power control information, where the power control information is used to control a power of user equipment; and a first sending unit, configured to send HARQ acknowledgment feedback information to X user equipments, where the HARQ acknowledgment feedback information carries power control information of at least one of the X user equipments, the X user equipments contend for use of a same transmission resource, and X is an integer greater than or equal to 1.

With reference to the third aspect, in a first possible implementation of the third aspect, the first sending unit is configured to:

send HARQ acknowledgment feedback information in a first format to the X user equipments, where the HARQ acknowledgment feedback information in the first format includes a first acknowledgment feedback field and a power control field, the power control field includes N power control subfields, the N power control subfields carry power control information of S user equipments, and one power control subfield is used to carry power control information of one user equipment at most; and the first acknowledgment feedback field includes index information of M user equipments, the index information of the M user equipments is used to indicate a correspondence between the power control subfields and the power control information of the S user equipments, and $1 \leq S \leq N \leq M$.

With reference to the third aspect, in a second possible implementation of the third aspect, the first sending unit is configured to:

send HARQ acknowledgment feedback information in a second format to the X user equipments, where the HARQ acknowledgment feedback information in the second format includes L subfields, and includes a first field, a special acknowledgment field, and a second field, the special acknowledgment field includes T subfields, and invalid information is in the special acknowledgment field; the second field includes N power control subfields, the N power control subfields carry power control information of S user equipments, and one power control subfield is used to carry power control information of one user equipment at most; and the first field includes W subfields, the W subfields carry index information of M user equipments, the index information of the M user equipments is used to indicate a correspondence between the power control subfields and the power control information of the S user equipments, $1 \leq S \leq N \leq W$, $1 \leq S \leq M \leq W$, and $L = N + T + W$.

With reference to the first possible implementation of the third aspect or the second possible implementation of the third aspect, in a third possible implementation of the third aspect, that the index information of the M user equipments is used to indicate the correspondence between the power control subfields and the power control information of the S user equipments is:

the power control information of the S user equipments is sequentially arranged in a first order along a preset direction of the N power control subfields starting from the first power control subfield in the preset direction, where the first order is the same as or opposite to an arrangement order of a first sequence constituted by pieces of index information that instruct to carry power control information of corresponding user equipments in the preset direction and that are among M pieces of index information.

With reference to the third possible implementation of the third aspect, in a fourth possible implementation of the third aspect, when N is equal to S, the N power control subfields carry power control information of N user equipments; or when N is greater than S, the N power control subfields carry the power control information of the S user equipments, and N−S power control subfields are filled with invalid information.

With reference to the first possible implementation of the third aspect, in a fifth possible implementation of the third aspect, the base station further includes:

a second sending unit, configured to send scheduling signaling to the X user equipments, where the scheduling signaling is used to indicate a format of the HARQ acknowledgment feedback information.

With reference to the fifth possible implementation of the third aspect, in a sixth possible implementation of the third aspect, the scheduling signaling includes a preset indication bit, and the format of the HARQ acknowledgment feedback information is indicated by using the preset indication bit; or the scheduling signaling is scrambled by using different preset scrambling codes, and the different preset scrambling codes correspond to formats of the HARQ acknowledgment feedback information.

With reference to the sixth possible implementation of the third aspect, in a seventh possible implementation of the third aspect, the base station further includes:

a third sending unit, configured to: if the scheduling signaling includes a preset indication bit, send, when the preset indication bit is a first value, HARQ acknowledgment feedback information in a third format to the X user equipments, where the HARQ acknowledgment feedback information in the third format includes a second acknowledgment feedback field; or if the scheduling signaling is scrambled by using different preset scrambling codes, send, when a preset scrambling code is a first scrambling code, HARQ acknowledgment feedback information in a third format to the X user equipments, where the HARQ acknowledgment feedback information in the third format includes a second acknowledgment feedback field.

With reference to the first possible implementation of the third aspect, in an eighth possible implementation of the third aspect, the base station further includes:

a fourth sending unit, configured to send first configuration signaling to the X user equipments, where the first configuration signaling includes a subfield quantity of the power control field of the HARQ acknowledgment feedback information in the first format.

With reference to the second possible implementation of the third aspect, in a ninth possible implementation of the third aspect, the base station further includes:

a fifth sending unit, configured to: when valid information is in the special acknowledgment field, send the HARQ acknowledgment feedback information in the second format to the X user equipments, where the N power control subfields do not carry power control information of user equipment.

With reference to the second possible implementation of the third aspect, in a tenth possible implementation of the third aspect, the base station further includes:

a sixth sending unit, configured to send second configuration signaling to the X user equipments, where the second configuration signaling includes location information of the special acknowledgment field.

According to a fourth aspect, user equipment is provided. The user equipment includes:

a first receiving unit, configured to receive HARQ acknowledgment feedback information sent by a base station to X user equipments, where the HARQ acknowledgment feedback information carries power control information of at least one of the X user equipments, the X user equipments contend for use of a same transmission resource, and X is an integer greater than or equal to 1; and a parsing unit, configured to parse the HARQ acknowledgment feedback information; and if it is determined that the HARQ acknowledgment feedback information includes the power control information of the user equipment, perform power control on the user equipment based on the power control information of the user equipment.

With reference to the fourth aspect, in a first possible implementation of the fourth aspect, the first receiving unit is configured to:

receive HARQ acknowledgment feedback information in a first format sent by the base station to the X user equipments, where the HARQ acknowledgment feedback information in the first format includes a first acknowledgment feedback field and a power control field, the power control field includes N power control subfields, the N power control subfields carry power control information of S user equipments, and one power control subfield is used to carry power control information of one user equipment at most; and the first acknowledgment feedback field includes index information of M user equipments, the index information of the M user equipments is used to indicate a correspondence between the power control subfields and the power control information of the S user equipments, and $1 \leq S \leq N \leq M$; and correspondingly, the parsing unit is configured to:

query index information corresponding to the user equipment from the index information of the M user equipments included in the first acknowledgment feedback field; and determine, based on the index information corresponding to the user equipment, and the correspondence that is between the power control subfields and the power control information of the S user equipments and that is indicated by the index information of the M user equipments, whether the power control subfields include the power control information of the user equipment.

With reference to the fourth aspect, in a second possible implementation of the fourth aspect, the first receiving unit is configured to:

receive HARQ acknowledgment feedback information in a second format sent by the base station to the X user equipments, where the HARQ acknowledgment feedback information in the second format includes L subfields, and includes a first field, a special acknowledgment field, and a second field, the special acknowledgment field includes T subfields, and invalid information is in the special acknowledgment field; the second field includes N power control subfields, the N power control subfields carry power control information of S user equipments, and one power control subfield is used to carry power control information of one user equipment at most; and the first field includes W subfields, the W subfields carry index information of M user equipments, the index information of the M user equipments is used to indicate a correspondence between the power control subfields and the power control information of the S user equipments, $1 \leq S \leq N \leq W$, $1 \leq S \leq M \leq W$, and $L = N + T + W$; and correspondingly, the parsing unit is configured to:

determine whether the first field includes the index information of the user equipment; and if it is determined that the first field includes the index information of the user equipment and it is determined that the invalid information is in the special acknowledgment field, determine, based on the index information corresponding to the user equipment, and the correspondence that is between the power control subfields and the power control information of the S user equipments and that is indicated by the index information of the M user equipments, whether the power control subfields include the power control information of the user equipment.

With reference to the first possible implementation of the fourth aspect or the second possible implementation of the fourth aspect, in a third possible implementation of the fourth aspect, that the index information of the M user equipments is used to indicate the correspondence between the power control subfields and the power control information of the S user equipments is: the power control information of the S user equipments is sequentially arranged in a first order along a preset direction of the N power control subfields starting from the first power control subfield in the preset direction, where the first order is the same as or opposite to an arrangement order of a first sequence constituted by pieces of index information that instruct to carry power control information of corresponding user equipments in the preset direction and that are among M pieces of index information; and correspondingly, the parsing unit is further configured to:

if the index information corresponding to the user equipment indicates that the power control subfields carry the power control information of the user equipment, sequentially arrange all of the pieces of index information that instruct to carry power control information of corresponding user equipments and that are of the M pieces of index information along the preset direction to generate the first sequence;

determine a sequence number i of the index information of the user equipment in the first sequence, where $1 \leq i \leq M$; and if the first order is the same as the arrangement order of the first sequence, determine that the $i^{th}$ piece of power control information starting from the first power control subfield in the preset direction is the power control information of the user equipment; or if the first order is opposite to the arrangement order of the first sequence, determine that the i$^{th}$ piece of power control information starting from the last power control subfield in the preset direction is the power control information of the user equipment.

With reference to the first possible implementation of the fourth aspect, in a fourth possible implementation of the fourth aspect, the user equipment further includes:

a second receiving unit, configured to receive scheduling signaling sent by the base station to the X user equipments, where the scheduling signaling is used to indicate a format of the HARQ acknowledgment feedback information; and correspondingly, the user equipment further includes:

a first determining unit, configured to determine the format of the HARQ acknowledgment feedback information based on the scheduling signaling.

With reference to the fourth possible implementation of the fourth aspect, in a fifth possible implementation of the fourth aspect, the scheduling signaling includes a preset indication bit, and the format of the HARQ acknowledgment feedback information is indicated by using the preset indication bit; and correspondingly, the first determining unit is configured to: when the preset indication bit is a first value, determine that the format of the HARQ acknowledgment feedback information is a third format, or when the preset indication bit is a second value, determine that the format of the HARQ acknowledgment feedback information is the first format; or the scheduling signaling is scrambled by using different preset scrambling codes, and the different preset scrambling codes correspond to formats of the HARQ acknowledgment feedback information; and correspondingly, the first determining unit is configured to: if a preset scrambling code is a first scrambling code, determine that the format of the HARQ acknowledgment feedback information is a third format, or if a preset scrambling code is a second scrambling code, determine that the format of the HARQ acknowledgment feedback information is the first format.

With reference to the fifth possible implementation of the fourth aspect, in a sixth possible implementation of the fourth aspect, the user equipment further includes:

a third receiving unit, configured to receive the HARQ acknowledgment feedback information in the third format sent by the base station to the X user equipments, where the HARQ acknowledgment feedback information in the third format includes a second acknowledgment feedback field.

With reference to the first possible implementation of the fourth aspect, in a seventh possible implementation of the fourth aspect, the user equipment further includes:

a fourth receiving unit, configured to receive first configuration signaling sent by the base station to the X user equipments, where the first configuration signaling includes a subfield quantity of power control field; and correspondingly, the user equipment further includes:

a second determining unit, configured to determine a length of the HARQ acknowledgment feedback information in the first format based on the subfield quantity of the power control field.

With reference to the second possible implementation of the fourth aspect, in an eighth possible implementation of the fourth aspect, the user equipment further includes:

a fifth receiving unit, configured to receive HARQ acknowledgment feedback information in a second format sent by the base station to the X user equipments, where the N power control subfields do not carry power control information of user equipment.

With reference to the second possible implementation of the fourth aspect, in a ninth possible implementation of the fourth aspect, the user equipment further includes:

a sixth receiving unit, configured to receive second configuration signaling sent by the base station to the X user equipments, where the second configuration signaling includes location information of the special acknowledgment field; and correspondingly, the parsing unit is further configured to:

determine a target location of the special acknowledgment field in the acknowledgment feedback information based on the location information of the special acknowledgment field, and if information on the target location is invalid information, determine that the invalid information is in the special acknowledgment field.

According to a fifth aspect, a base station is provided. The base station includes: a processor, a memory, a system bus, and a transmitter/receiver; and the memory is configured to store a computer-executable instruction, the transmitter/receiver is configured to send information or signaling to another device, and is configured to receive information or signaling sent by the another device, the processor is connected to the memory and the transmitter/receiver by using the system bus, and when the base station runs, the processor executes, by using the transmitter/receiver, the computer-executable instruction stored in the memory, so that the base station performs the uplink power control method according to any one of the first aspect to the tenth possible implementation of the first aspect.

According to a sixth aspect, user equipment is provided. The user equipment includes: a processor, a memory, a system bus, and a transmitter/receiver; and the memory is configured to store a computer-executable instruction, the transmitter/receiver is configured to send information or signaling to another device, and is configured to receive information or signaling sent by the another device, the processor is connected to the memory and the transmitter/receiver by using the system bus, and when the user equipment runs, the processor executes, by using the transmitter/receiver, the computer-executable instruction stored in the memory, so that the user equipment performs the uplink power control method according to any one of the second aspect to the ninth possible implementation of the second aspect.

According to a seventh aspect, a communications system is provided. The communications system includes the base station according to the fifth aspect, and the user equipment according to the sixth aspect.

Based on the uplink power control method and the apparatus provided in the embodiments of the present disclosure, the base station determines the power control information, where the power control information is used to control the power of the user equipment; and sends the HARQ acknowledgment feedback information to the X user equipments, where the HARQ acknowledgment feedback information carries the power control information of the at least one of the X user equipments, the X user equipments contend for use of the same transmission resource, and X is an integer greater than or equal to 1. Then, the user equipment receives the HARQ acknowledgment feedback information sent by the base station to the X user equipments; parses the HARQ acknowledgment feedback information; and if it is determined that the HARQ acknowledgment feedback information includes the power control information of the user equipment, performs power control on the user equipment based on the power control information of the user equipment. Therefore, the base station performs uplink closed-loop power control on the user equipment based on maintained original signaling.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art according to the embodiments of the present disclosure without creative efforts shall fall within the protection scope of the present disclosure.

Figure 1:
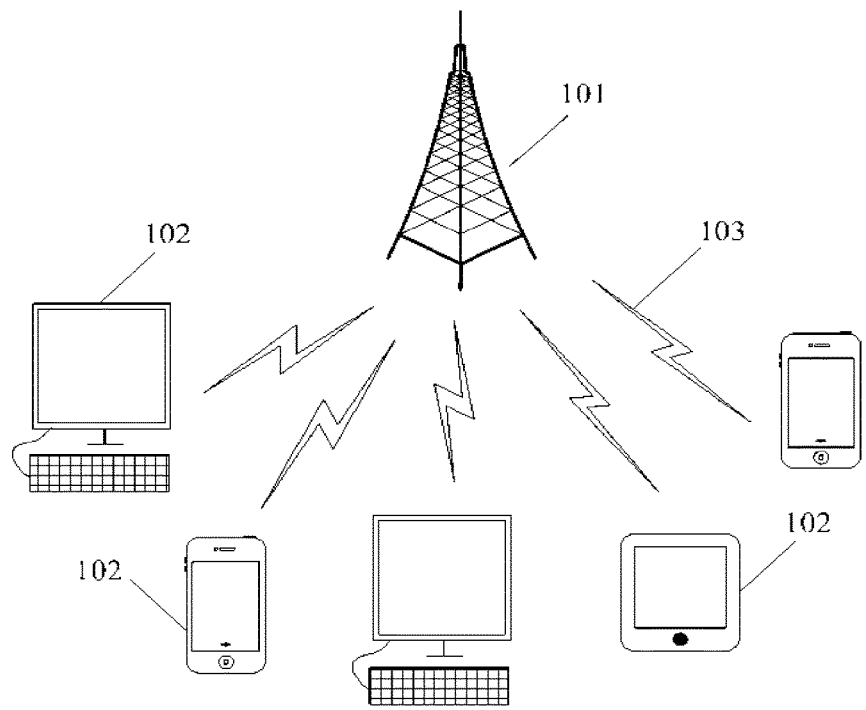
FIG. 1 is a diagram of a system architecture of a communications system according to an embodiment of the present disclosure.

A system architecture of a communications system to which the embodiments of the present disclosure are applied is shown in FIG. 1, and a diagram of the system architecture includes a base station 101, user equipment 102, and a communication channel 103.

The base station 101 has a packet scheduling function of a shared channel, to establish scheduling based on a history of packet data sent to the user equipment 102. Packet scheduling is that when a plurality of user equipments contend for use of a same transmission resource, a mechanism is needed to determine a service order and effectively allocate a transmission resource, so as to obtain a statistical multiplexing gain.

The user equipment 102 may be a plurality of user equipments belonging to a same contention transmission resource group, and the user equipment 102 has a function of sending and receiving packet data by using the communication channel 103 established between the user equipment 102 and the base station 101. The user equipment 102 performs receiving processing of the shared channel based on information sent by using a scheduling control channel. Additionally, the user equipment 102 may be a mobile station, a mobile phone, a computer, a portable device, or the like.

Packet data is received and sent between the base station 101 and the user equipment 102 by using the communication channel 103, the communication channel 103 may be a radio communication channel, and at least the shared channel and the scheduling control channel exist in the radio communication channel. To send and receive a packet, the shared channel is for public use among a plurality of user equipments 102, and the scheduling control channel is used to send an allocation result, a corresponding scheduling result, and the like of the shared channel.

Figure 2:
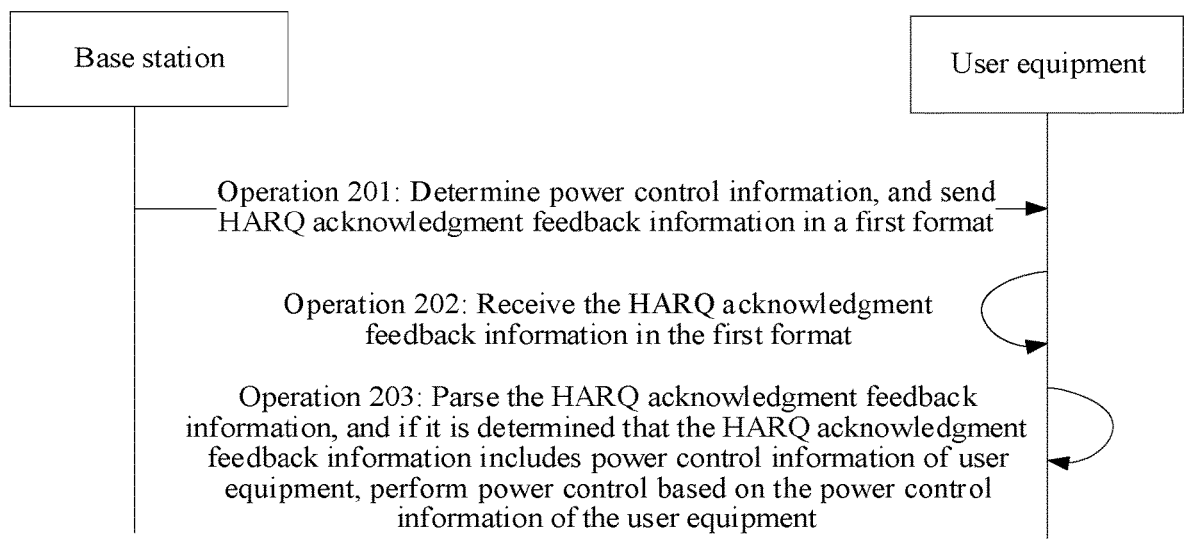
FIG. 2 is a flowchart of a first uplink power control method according to an embodiment of the present disclosure.

FIG. 2 is a flowchart of an uplink power control method according to an embodiment of the present disclosure. Referring to FIG. 2, the method includes the following several operations.

Operation 201: A base station determines power control information, where the power control information is used to control a power of user equipment; and sends HARQ acknowledgment feedback information to X user equipments, where the HARQ acknowledgment feedback information carries power control information of at least one of the X user equipments, the X user equipments contend for use of a same transmission resource, and X is an integer greater than or equal to 1.

The HARQ acknowledgment feedback information sent by the base station to the X user equipments is HARQ acknowledgment feedback information in a first format, and the HARQ acknowledgment feedback information in the first format includes a first acknowledgment feedback field and a power control field, the power control field includes N power control subfields, the N power control subfields carry power control information of S user equipments, and one power control subfield is used to carry power control information of one user equipment at most; and the first acknowledgment feedback field includes index information of M user equipments, the index information of the M user equipments is used to indicate a correspondence between the power control subfields and the power control information of the S user equipments, and 1≤S≤N≤M.

That is, the HARQ acknowledgment feedback information in the first format includes two parts, where the first acknowledgment feedback field is used to carry acknowledgment information of the user equipment, and that the first acknowledgment feedback field includes the index information of the M user equipments may be that the first acknowledgment feedback field includes M subfields, and each subfield may correspond to index information of one user equipment; and the power control field is used to carry power control information of the user equipment, and each power control subfield may be used to carry power control information of one user equipment, or may not carry power control information of user equipment.

For example, M=6, N=2, and S=1. That is, the HARQ acknowledgment feedback information in the first format includes six subfields and two power control subfields, the six subfields may include index information of six user equipments at most, one of the two power control subfields carries power control information of user equipment, and the other do not carry power control information of user equipment.

It should be noted that, the X user equipments may include one or more user equipments, and the X user equipments share a same carrier unit. Therefore, a problem of contending for a same transmission resource exists among the X user equipments.

Additionally, at least one of the X user equipments is user equipment whose corresponding power control information is carried in the HARQ acknowledgment feedback information, on which power control is intended to be performed, and that is determined in the X user equipments, and the at least one user equipment may be determined by using a transmission bit rate, a bit error rate, a packet loss rate, and the like of the X user equipments. For a specific method for determining, by the base station, user equipment on which power control is intended to be performed, refer to a related technology. Details are not described herein in this embodiment of the present disclosure.

Further, that the index information of the M user equipments is used to indicate the correspondence between the power control subfields and the power control information of the S user equipments is: the power control information of the S user equipments is sequentially arranged in a first order along a preset direction of the N power control subfields starting from the first power control subfield in the preset direction.

The first order is the same as or opposite to an arrangement order of a first sequence constituted by pieces of index information that instruct to carry power control information of corresponding user equipments in the preset direction and that are among M pieces of index information.

It should be noted that, the first order is determined based on an order of the S user equipments in the first acknowledgment feedback field, and the first sequence is an order of the user equipments corresponding to the power control information carried in the power control subfields in the preset direction.

For example, if M=6, user equipments No. 1, No. 3 and No. 5 are at least one determined user equipment in index information of six user equipments, and a sequence number may be used to represent a corresponding user equipment herein, the first order may be 1 3 5 or 5 3 1, as shown in Table 1. If the preset direction is from left to right, that is, the user equipments corresponding to the power control information carried in the power control subfields are arranged in an order from left to right. If the first order is the same as the arrangement order of the first sequence, when the first order is 1 3 5, the first sequence is also 1 3 5, or when the first order is 5 3 1, the first sequence is also 5 3 1; or if the first order is opposite to the arrangement order of the first sequence, when the first order is 1 3 5, the first sequence is 5 3 1, or when the first order is 5 3 1, the first sequence is 1 3 5.

If the preset direction is from right to left, that is, the user equipments corresponding to the power control information carried in the power control subfields are arranged in an order from right to left. If the first order is the same as the arrangement order of the first sequence, when the first order is 1 3 5, the first sequence is also 1 3 5, or when the first order is 5 3 1, the first sequence is also 5 3 1; or if the first order is opposite to the arrangement order of the first sequence, when the first order is 1 3 5, the first sequence is 5 3 1, or when the first order is 5 3 1, the first sequence is 1 3 5.

TABLE 1

| Preset direction | First order | First sequence | | | Same or opposite |
|---|---|---|---|---|---|
| from left to right | 1 3 5 | 1 | 3 | 5 | same |
|  |  | 5 | 3 | 1 | opposite |
| from right to left | 5 3 1 | 5 | 3 | 1 | same |
|  |  | 1 | 3 | 5 | opposite |

It should be noted that, in this embodiment of the present disclosure, an example in which only the preset direction, the first order, the first sequence, and the first order being the same as or opposite to the first sequence that are shown in Table 1 is used for description, and Table 1 does not limit this embodiment of the present disclosure.

Further, when N is equal to S, the N power control subfields carry power control information of N user equipments; or when N is greater than S, the N power control subfields carry the power control information of the S user equipments, and N−S power control subfields are filled with invalid information.

That is, when a quantity of the S determined user equipments on which power control is intended to be performed is equal to a quantity of the power control subfields, each power control subfield carries power control information of one user equipment; or when a quantity of the S determined user equipments on which power control is intended to be performed is less than a quantity of the power control subfields, the power control information of the S user equipments is carried in N power control subfields, and remaining N−S power control subfields are filled with invalid information.

For example, N=3, and S=2. Because N is less than S, two of three power control subfields carry power control information of two user equipments, and the other one power control subfield is filled with invalid information.

Operation 202: The user equipment receives the HARQ acknowledgment feedback information sent by the base station to the X user equipments, where the HARQ acknowledgment feedback information carries power control information of at least one of the X user equipments, the X user equipments contend for use of a same transmission resource, and X is an integer greater than or equal to 1.

The HARQ acknowledgment feedback information may be sent by the base station after it is determined that user equipment on which power control is intended to be performed exists, that is, the HARQ acknowledgment feedback information received by the user equipment is the HARQ acknowledgment feedback information in the first format. For the specific HARQ acknowledgment feedback information in the first format, refer to the description in operation 201. Details are not described herein again in this embodiment of the present disclosure.

Operation 203: The user equipment parses the HARQ acknowledgment feedback information; and if it is determined that the HARQ acknowledgment feedback information includes the power control information of the user equipment, performs power control on the user equipment based on the power control information of the user equipment.

When the HARQ acknowledgment feedback information is the HARQ acknowledgment feedback information in the first format, the parsing, by the user equipment, the HARQ acknowledgment feedback information includes: querying, by the user equipment, index information corresponding to the user equipment from the index information of the M user equipments included in the first acknowledgment feedback field; and determining, based on the index information corresponding to the user equipment, and the correspondence that is between the power control subfields and the power control information of the S user equipments and that is indicated by the index information of the M user equipments, whether the power control subfields include the power control information of the user equipment.

The user equipment may search for the index information of the user equipment from the index information of the M user equipments based on an index number of the user equipment and the like. The index information of the user equipment and a valid subfield of the power control field may indicate whether a power control subfield includes the power control information of the user equipment. Therefore, the user equipment may determine whether the HARQ acknowledgment feedback information includes the power control information of the user equipment, and performs no subsequent operation if the user equipment determines that the HARQ acknowledgment feedback information does not include the power control information of the user equipment; or if the user equipment determines that the HARQ acknowledgment feedback information includes the power control information of the user equipment, the user equipment may obtain the power control information of the user equipment based on the correspondence that is between the power control subfields and the power control information of the S user equipments and that is indicated by the index information of the M user equipments, and therefore performs power control on the user equipment based on the obtained power control information of the user equipment.

Further, that the index information of the M user equipments is used to indicate the correspondence between the power control subfields and the power control information of the S user equipments is: the power control information of the S user equipments is sequentially arranged in a first order along a preset direction of the N power control subfields starting from the first power control subfield in the preset direction.

The first order is the same as or opposite to an arrangement order of a first sequence constituted by pieces of index information that instruct to carry power control information of corresponding user equipments in the preset direction and that are among M pieces of index information.

Correspondingly, operation 203 is:

if the index information corresponding to the user equipment indicates that the power control subfields carry the power control information of the user equipment, sequentially arranging all of the pieces of index information that instruct to carry power control information of corresponding user equipments and that are of the M pieces of index information along the preset direction to generate the first sequence; determining a sequence number i of the index information of the user equipment in the first sequence, where 1≤i≤M; and if the first order is the same as the arrangement order of the first sequence, determining that the $i^{th}$ piece of power control information starting from the first power control subfield in the preset direction is the power control information of the user equipment; or if the first order is opposite to the arrangement order of the first sequence, determining that the $i^{th}$ piece of power control information starting from the last power control subfield in the preset direction is the power control information of the user equipment.

For example, the first order is 1 3 5, the preset direction is from left to right, and the first sequence constituted by sequentially arranging all of the pieces of index information that instruct to carry power control information of corresponding user equipments and that are of the M pieces of index information along the preset direction is 1 3 5. If the user equipment is No. 5, it is determined that a location of the index information of the user equipment in the first sequence is a third location, that is, a sequence number of the index information of the user equipment in the first sequence is 3. When the first order is the same as the arrangement order of the first sequence, determining that third power control information starting from the first power control subfield from left to right is the power control information of the user equipment; or when the first order is opposite to the arrangement order of the first sequence, determining that third power control information starting from the last power control subfield from left to right is the power control information of the user equipment.

Figure 4:
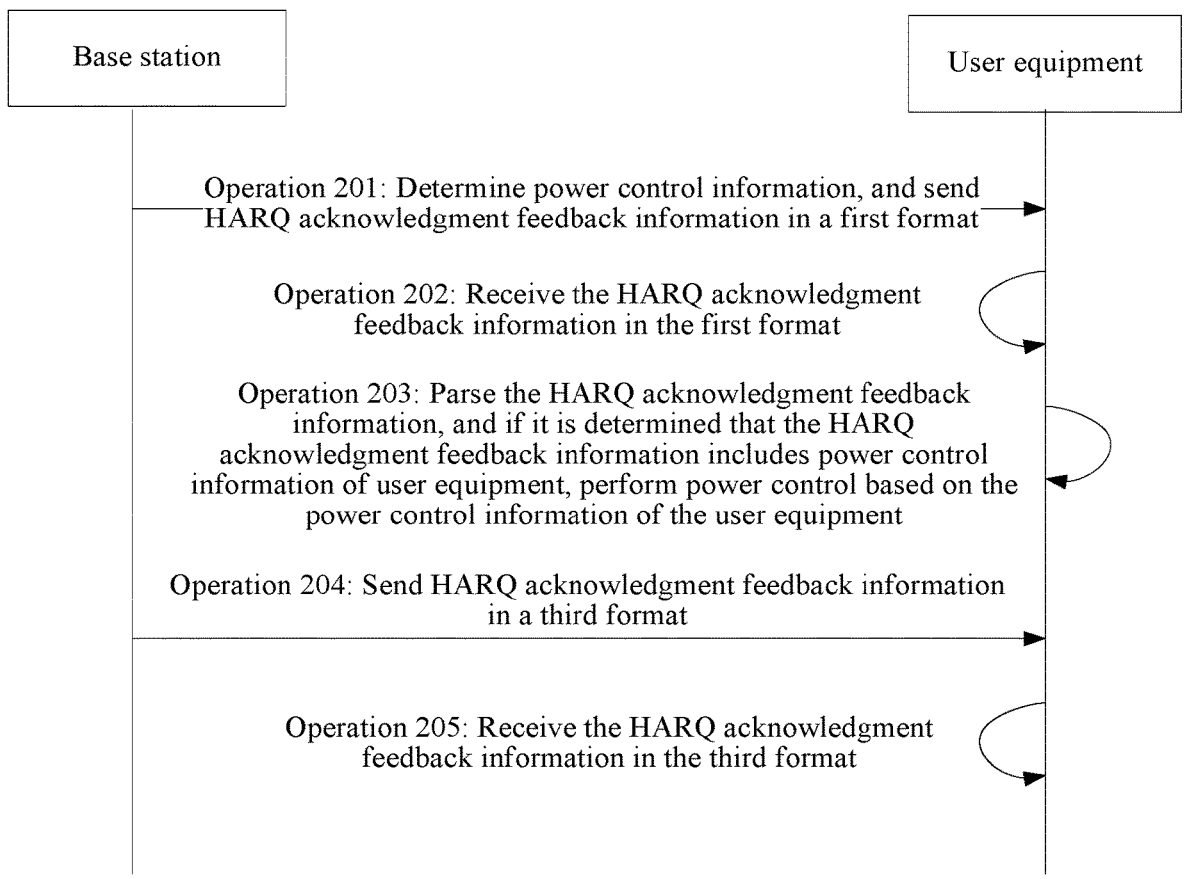
FIG. 4 is a flowchart of a second uplink power control method according to an embodiment of the present disclosure.

Optionally, referring to FIG. 4, the method further includes the following operation.

Operation 204: The base station sends HARQ acknowledgment feedback information in a third format to the X user equipments, where the HARQ acknowledgment feedback information in the third format includes a second acknowledgment feedback field.

If it is determined that user equipment on which power control is intended to be performed does not exist, the base station sends HARQ acknowledgment feedback information carrying no power control information, that is, the HARQ acknowledgment feedback information in the third format to the X user equipments.

For a specific method for distinguishing the HARQ acknowledgment feedback information in the first format and the HARQ acknowledgment feedback information in the third format, refer to operation 206 to operation 208. Details are not described herein again in this embodiment of the present disclosure.

Correspondingly, the method further includes the following operation.

Operation 205: The user equipment receives the HARQ acknowledgment feedback information in the third format sent by the base station to the X user equipments, where the HARQ acknowledgment feedback information in the third format includes the second acknowledgment feedback field.

The HARQ acknowledgment feedback information in the third format is sent by the base station after it is determined that user equipment on which power control is intended to be performed does not exist, and the HARQ acknowledgment feedback information in the third format includes only the second acknowledgment feedback field, and does not carry power control information of user equipment.

It should be noted that the HARQ acknowledgment feedback information in the third format is used to confirm and receive acknowledgment information between the base station and the user equipment, and does not carry power control information of user equipment, and the HARQ acknowledgment feedback information in the third format is the same as acknowledgment feedback information in the prior art. This is not described in this embodiment of the present disclosure.

Additionally, operation 201 and operation 204 are not performed in an order. Whether acknowledgment feedback information sent by the base station to the X user equipments is the HARQ acknowledgment feedback information in the first format or the HARQ acknowledgment feedback information in the third format is determined by the base station based on a result of determining whether user equipment on which power control is intended to be performed exists. That is, when user equipment on which power control is intended to be performed exists, the base station sends the HARQ acknowledgment feedback information in the first format; or when user equipment on which power control is intended to be performed does not exist, the base station sends the HARQ acknowledgment feedback information in the third format.

Figure 3:
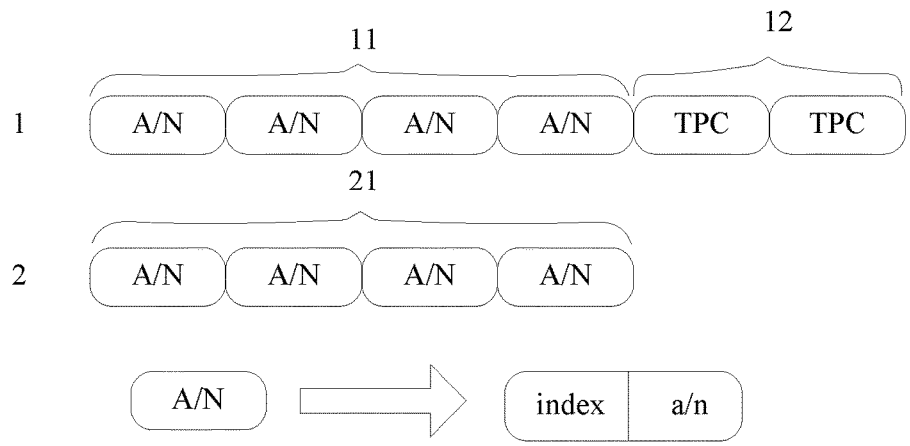
FIG. 3 is a schematic structural diagram of acknowledgment feedback information according to an embodiment of the present disclosure.

For example, as shown in FIG. 3, HARQ acknowledgment feedback information 1 in the first format includes a first acknowledgment feedback field 11 and a power control field 12. It is assumed that the first acknowledgment feedback field 11 includes four subfields and the power control field 12 includes two power control subfields. HARQ acknowledgment feedback information 2 in the third format includes a second acknowledgment feedback field 21, and it is assumed that the second acknowledgment feedback field 21 includes four subfields. In the diagram, A/N is used to indicate a subfield in the first acknowledgment feedback field 11 and the second acknowledgment feedback field 21, and each subfield A/N may include one piece of index information and one piece of acknowledgment information. As shown in the diagram, index is used to indicate index information, a/n is used to indicate one piece of acknowledgment information, and transmission power control (TPC) is used to indicate a power control subfield in the power control field 12.

Figure 5:
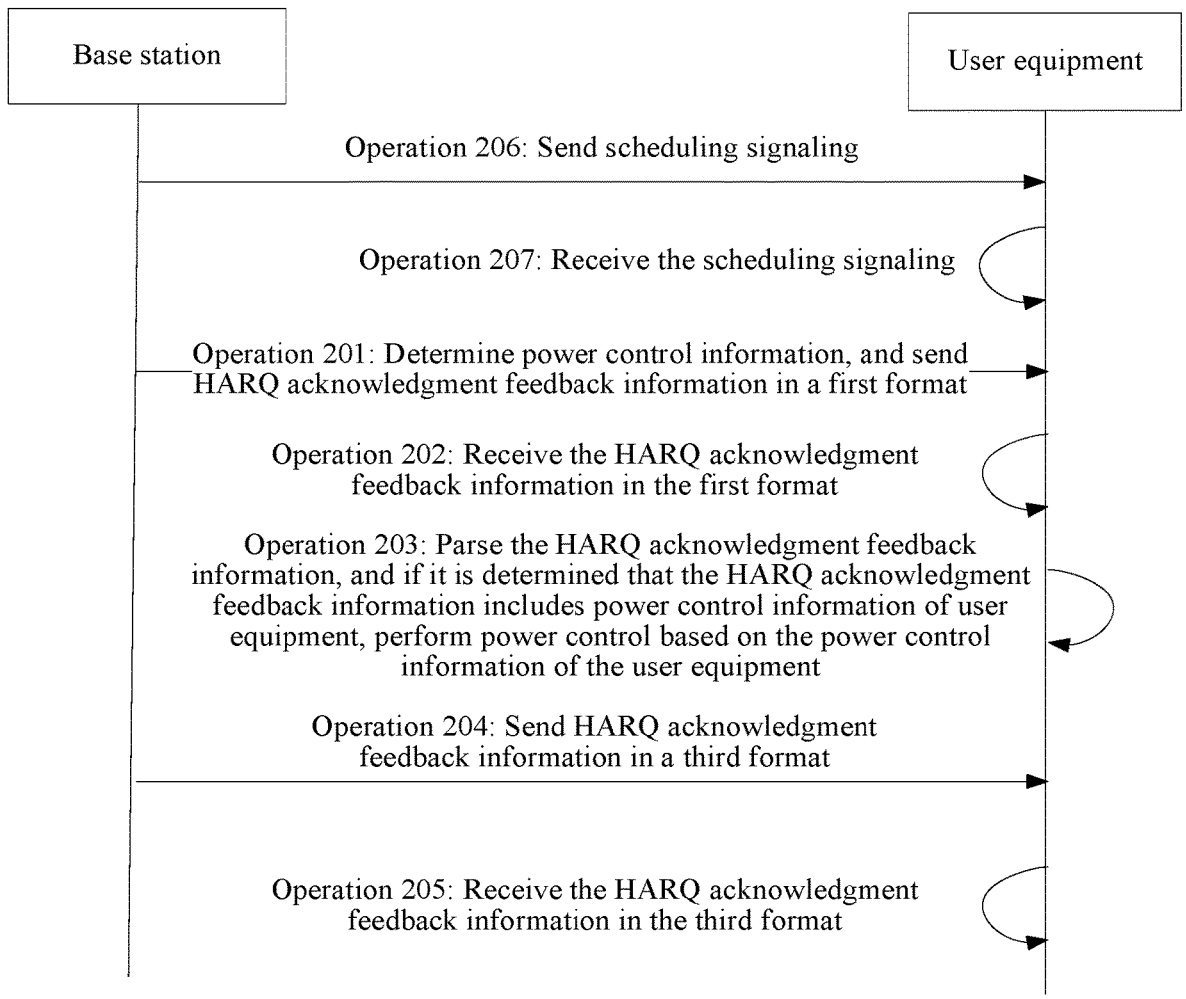
FIG. 5 is a flowchart of a third uplink power control method according to an embodiment of the present disclosure.

Optionally, referring to FIG. 5, before operation 201, the method further includes the following operation.

Operation 206: The base station sends scheduling signaling to the X user equipments, where the scheduling signaling is used to indicate a format of the HARQ acknowledgment feedback information.

The scheduling signaling includes a preset indication bit, and the format of the HARQ acknowledgment feedback information is indicated by using the preset indication bit; or the scheduling signaling is scrambled by using different preset scrambling codes, and the different preset scrambling codes correspond to formats of the HARQ acknowledgment feedback information.

If the scheduling signaling includes a preset indication bit, when a value on the preset indication bit may be set to a first value, the first value is used to indicate that the format of the HARQ acknowledgment feedback information is the third format, or when a value on the preset indication bit is set to a second value, the second value is used to indicate that the format of the HARQ acknowledgment feedback information is the first format; or if the scheduling signaling is scrambled by using different preset scrambling codes, when scrambling may be set to be performed by using a first scrambling code, the first scrambling code is used to indicate that the format of the HARQ acknowledgment feedback information is the third format, or when scrambling is set to be performed by using a second scrambling code, the second scrambling code is used to indicate that the format of the HARQ acknowledgment feedback information is the first format.

The preset indication bit may belong to a field that may be re-explained in the scheduling signaling, and the first value and the second value may be preset. For example, the first value may be 0, and the second value may be 1, or the first value may be 1, and the second value may be 0. This is not limited in this embodiment of the present disclosure.

Additionally, the first scrambling code and the second scrambling code may also be preset. For example, the first scrambling code is a contention based radio network temporary identifier (CB-RNTI), and the second scrambling code is a contention based transmission power control radio network temporary identifier (CB-TPC-RNTI), or the first scrambling code is a CB-TPC-RNTI, and the second scrambling code is a CB-RNTI. In actual application, the first scrambling code and the second scrambling code may also be other scrambling codes, and this is not limited in this embodiment of the present disclosure.

Correspondingly, the method further includes the following operation.

Operation 207: The user equipment receives scheduling signaling sent by the base station to the X user equipments, where the scheduling signaling is used to indicate a format of the HARQ acknowledgment feedback information.

The scheduling signaling is similar to the scheduling signaling in operation 206, and details are not described herein again in this embodiment of the present disclosure.

Figure 6:
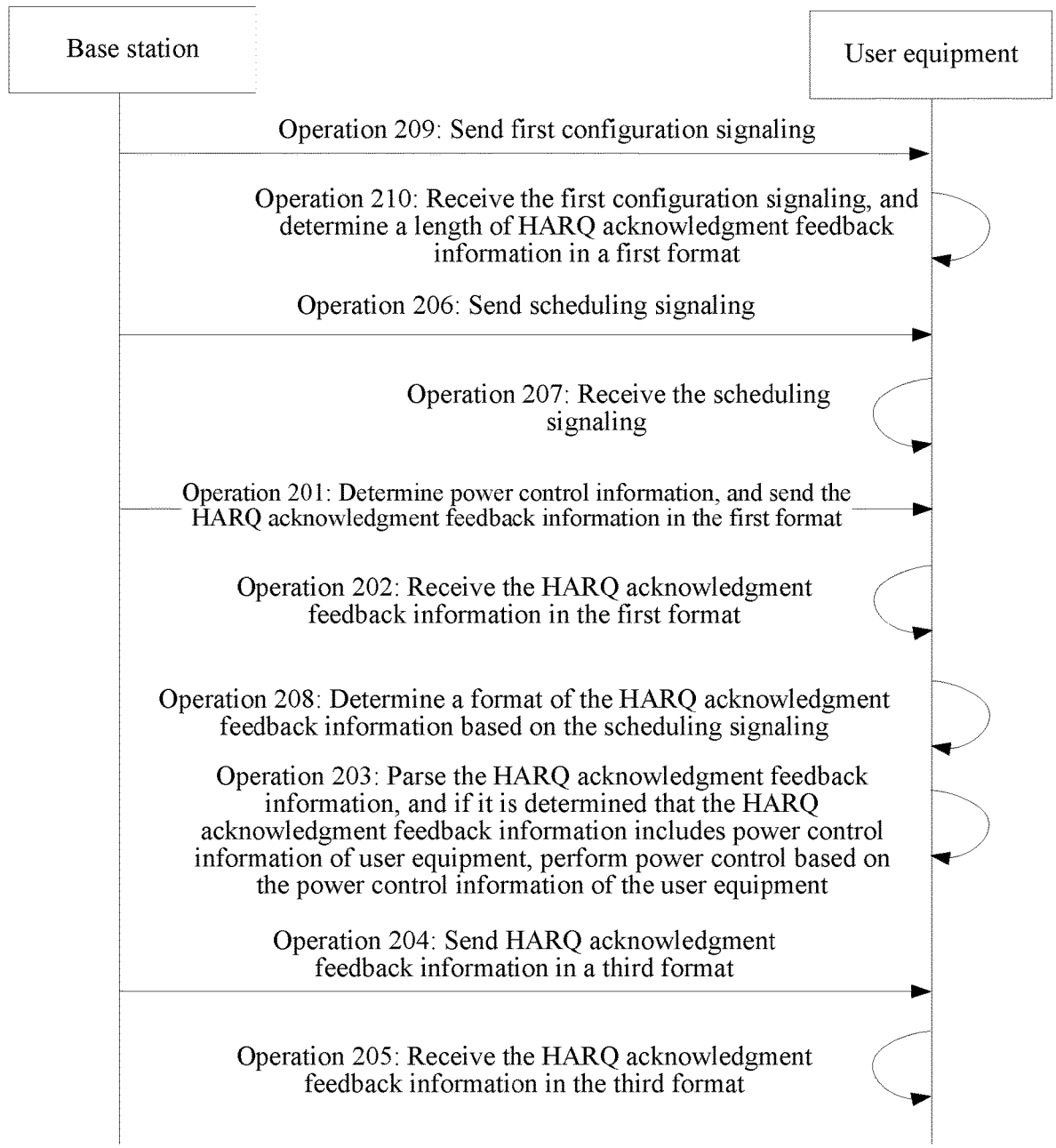
FIG. 6 is a flowchart of a fourth uplink power control method according to an embodiment of the present disclosure.

Correspondingly, referring to FIG. 6, before operation 203, when receiving the HARQ acknowledgment feedback information, the user equipment needs to distinguish, based on the scheduling signaling, whether the received HARQ acknowledgment feedback information is in the first format or the third format. Therefore, the method may further include the following operation.

Operation 208: The user equipment determines the format of the HARQ acknowledgment feedback information based on the scheduling signaling.

If the scheduling signaling includes the preset indication bit, and the format of the HARQ acknowledgment feedback information is indicated by using the preset indication bit, when the user equipment determines that the preset indication bit is the first value, it is determined that the format of the HARQ acknowledgment feedback information is the third format; or when the user equipment determines that the preset indication bit is the second value, it is determined that the format of the HARQ acknowledgment feedback information is the first format.

Alternatively, if the scheduling signaling is scrambled by using different preset scrambling codes, and the different preset scrambling codes correspond to formats of the HARQ acknowledgment feedback information, when the user equipment determines that a preset scrambling code is the first scrambling code, it is determined that the format of the HARQ acknowledgment feedback information is the third format; or when the user equipment determines that a preset scrambling code is the second scrambling code, it is determined that the format of the HARQ acknowledgment feedback information is the first format.

Optionally, referring to FIG. 6, before operation 201, the method further includes the following operation.

Operation 209: The base station sends first configuration signaling to the X user equipments, where the first configuration signaling includes a subfield quantity of the power control field of the HARQ acknowledgment feedback information in the first format.

The HARQ acknowledgment feedback information of the power control field is newly added to the HARQ acknowledgment feedback information in the first format based on the first acknowledgment feedback field, that is, the power control field is added to the HARQ acknowledgment feedback information in the prior art, and when obtaining information from the received HARQ acknowledgment feedback information, the user equipment needs to learn a length of the HARQ acknowledgment feedback information. Therefore, the base station needs to notify the X user equipments of the subfield quantity of the power control field in the HARQ acknowledgment feedback information in the first format.

Correspondingly, the method further includes the following operation.

Operation 210: The user equipment receives first configuration signaling sent by the base station to the X user equipments, where the first configuration signaling includes a subfield quantity of power control field.

After the user equipment receives the HARQ acknowledgment feedback information in the first format sent by the base station to the X user equipments, the user equipment may determine a length of the HARQ acknowledgment feedback information in the first format based on the subfield quantity of the power control field included in the first configuration signaling.

Based on the uplink power control method provided in this embodiment of the present disclosure, the base station determines the power control information, where the power control information is used to control the power of the user equipment; and sends the HARQ acknowledgment feedback information to the X user equipments, where the HARQ acknowledgment feedback information carries the power control information of the at least one of the X user equipments, the X user equipments contend for use of the same transmission resource, and X is an integer greater than or equal to 1. Then, when receiving the HARQ acknowledgment feedback information, the user equipment parses the HARQ acknowledgment feedback information; and if it is determined that the HARQ acknowledgment feedback information includes the power control information of the user equipment, performs power control on the user equipment based on the power control information of the user equipment. Therefore, the base station performs uplink closed-loop power control on the user equipment based on original signaling.

Figure 7:
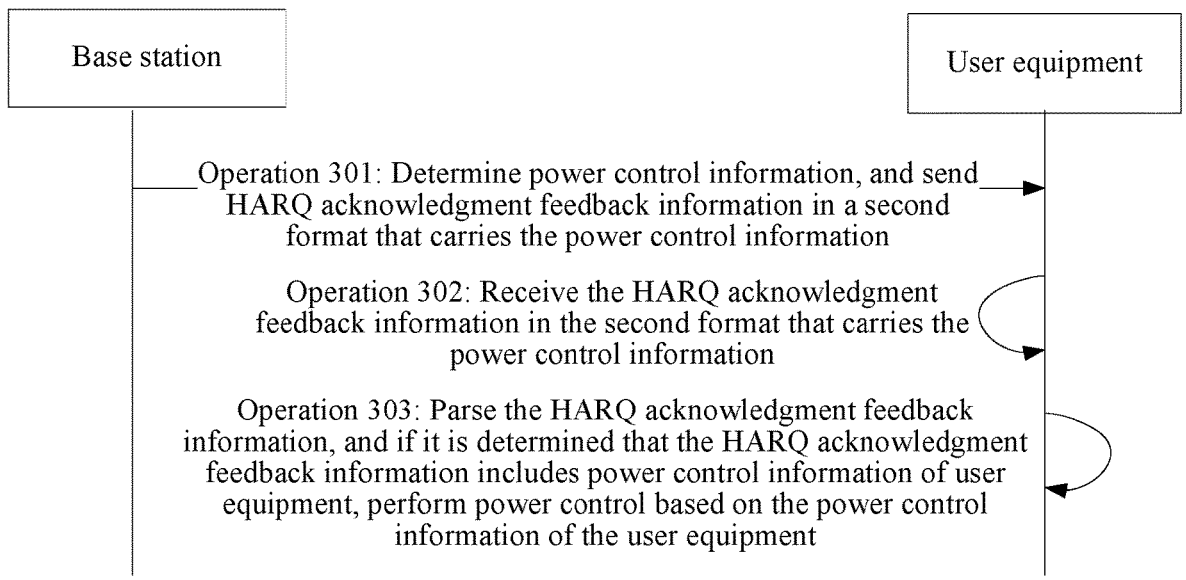
FIG. 7 is a flowchart of a fifth uplink power control method according to an embodiment of the present disclosure.

FIG. 7 is a flowchart of an uplink power control method according to an embodiment of the present disclosure. Referring to FIG. 7, the method includes the following several operations.

Operation 301: A base station determines power control information, where the power control information is used to control a power of user equipment; and sends HARQ acknowledgment feedback information to X user equipments, where the HARQ acknowledgment feedback information carries power control information of at least one of the X user equipments, the X user equipments contend for use of a same transmission resource, and X is an integer greater than or equal to 1.

The base station sends HARQ acknowledgment feedback information in a second format to the X user equipments, where the HARQ acknowledgment feedback information in the second format includes L subfields, and includes a first field, a special acknowledgment field, and a second field, the special acknowledgment field includes T subfields, and invalid information is in the special acknowledgment field; the second field includes N power control subfields, the N power control subfields carry power control information of S user equipments, and one power control subfield is used to carry power control information of one user equipment at most; and the first field includes W subfields, the W subfields carry index information of M user equipments, the index information of the M user equipments is used to indicate a correspondence between the power control subfields and the power control information of the S user equipments, $1 \leq S \leq N \leq W$, $1 \leq S \leq M \leq W$, and $L=N+T+W$.

That is, based on HARQ acknowledgment feedback information in a third format, an acknowledgment feedback field in the prior art is divided into three fields, that is, a first field, a special acknowledgment field, and a second field, and invalid information is in the special acknowledgment field; the first field is used to carry acknowledgment information of the user equipment, and the first field may carry index information of W user equipments at most, and actually carries index information of M the user equipments, where M is less than or equal to W; and the second field is used to carry power control information of the user equipment, and each power control subfield may be used to carry power control information of one user equipment, or may not carry power control information of user equipment.

It should be noted that, the special acknowledgment field includes T subfields, where T is an integer greater than or equal to 1. That is, the special acknowledgment field may be a subfield or a plurality of subfields, and when the special acknowledgment field is a plurality of subfields, invalid information is in each subfield.

For example, M=3, T=1, N=2, and S=1. That is, the first field of the HARQ acknowledgment feedback information in the third format includes three subfields, the second field includes two power control subfields, only one of the two power control subfields carries power control information of the user equipment, and the power control subfield that does not carry power control information of user equipment is filled with invalid information.

It should be noted that, the X user equipments includes one or more user equipments, and the X user equipments share a same carrier unit. Therefore, a problem of contending for a same transmission resource exists among the X user equipments.

Additionally, at least one of the X user equipments is user equipment whose corresponding power control information is carried in the HARQ acknowledgment feedback information, on which power control is intended to be performed, and that is determined in the X user equipments, and the at least one user equipment may be determined by using a transmission bit rate, a bit error rate, a packet loss rate, and the like of the X user equipments. For a specific method for determining, by the base station, user equipment on which power control is intended to be performed, refer to a related technology. Details are not described herein in this embodiment of the present disclosure.

Further, that the index information of the M user equipments is used to indicate the correspondence between the power control subfields and the power control information of the S user equipments is: the power control information of the S user equipments is sequentially arranged in a first order along a preset direction of the N power control subfields starting from the first power control subfield in the preset direction.

The first order is the same as or opposite to an arrangement order of a first sequence constituted by pieces of index information that instruct to carry power control information of corresponding user equipments in the preset direction and that are among M pieces of index information.

For example, if M=6, user equipments No. 1, No. 3 and No. 5 are at least one determined user equipment in index information of six user equipments, and a sequence number may be used to represent a corresponding user equipment herein, the first order may be 1 3 5 or 5 3 1. If the preset direction is from left to right, that is, the user equipments corresponding to the power control information carried in the power control subfields are arranged in an order from left to right. If the first order is the same as the arrangement order of the first sequence, when the first order is 1 3 5, the first sequence is also 1 3 5, or when the first order is 5 3 1, the first sequence is also 5 3 1; or if the first order is opposite to the arrangement order of the first sequence, when the first order is 1 3 5, the first sequence is 5 3 1, or when the first order is 5 3 1, the first sequence is 1 3 5.

If the preset direction is from right to left, that is, the user equipments corresponding to the power control information carried in the power control subfields are arranged in an order from right to left. If the first order is the same as the arrangement order of the first sequence, when the first order is 1 3 5, the first sequence is also 1 3 5, or when the first order is 5 3 1, the first sequence is also 5 3 1; or if the first order is opposite to the arrangement order of the first sequence, when the first order is 1 3 5, the first sequence is 5 3 1, or when the first order is 5 3 1, the first sequence is 1 3 5.

Further, when N is equal to S, the N power control subfields carry power control information of N user equipments; or when N is greater than S, the N power control subfields carry the power control information of the S user equipments, and N−S power control subfields are filled with invalid information.

For example, N=3, and S=2. Because N is less than S, two of three power control subfields carry power control information of two user equipments, and the other one power control subfield is filled with invalid information.

Operation 302: The user equipment receives the HARQ acknowledgment feedback information sent by the base station to the X user equipments, where the HARQ acknowledgment feedback information carries power control information of at least one of the X user equipments, the X user equipments contend for use of a same transmission resource, and X is an integer greater than or equal to 1.

The HARQ acknowledgment feedback information may be sent by the base station after it is determined that user equipment on which power control is intended to be performed exists, that is, the HARQ acknowledgment feedback information received by the user equipment is the HARQ acknowledgment feedback information in the second format, and carries the power control information of the user equipment. For the specific HARQ acknowledgment feedback information in the second format, refer to the description in operation 301. Details are not described herein again in this embodiment of the present disclosure.

Operation 303: The user equipment parses the HARQ acknowledgment feedback information; and if it is determined that the HARQ acknowledgment feedback information includes the power control information of the user equipment, performs power control on the user equipment based on the power control information of the user equipment.

When the HARQ acknowledgment feedback information in the second format carries the power control information of the user equipment, the user equipment may determine, based on an index number of the user equipment and the like, whether the first field includes index information of the user equipment. If the first field includes the index information of the user equipment, because the index information of the user equipment and valid information of a power control subfield may indicate whether the power control subfield includes the power control information of the user equipment, the user equipment performs no subsequent operation if the user equipment determines that the acknowledgment feedback information does not include the power control information of the user equipment; or if the user equipment determines that the acknowledgment feedback information includes the index information of the user equipment, and determines that invalid information is in the special acknowledgment field, the user equipment may determine, based on the correspondence that is between the power control subfields and the power control information of the S user equipments and that is indicated by the index information of the M user equipments, whether the acknowledgment feedback information includes the power control information of the user equipment. If the acknowledgment feedback information includes the power control information of the user equipment, the user equipment obtains the power control information of the user equipment, and therefore performs power control on the user equipment based on the obtained power control information; otherwise, does not perform power control.

Further, that the index information of the M user equipments is used to indicate the correspondence between the power control subfields and the power control information of the S user equipments is: the power control information of the S user equipments is sequentially arranged in a first order along a preset direction of the N power control subfields starting from the first power control subfield in the preset direction.

The first order is the same as or opposite to an arrangement order of a first sequence constituted by pieces of index information that instruct to carry power control information of corresponding user equipments in the preset direction and that are among M pieces of index information.

Correspondingly, operation 303 is:

if the index information corresponding to the user equipment indicates that the power control subfields carry the power control information of the user equipment, sequentially arranging all of the pieces of index information that instruct to carry power control information of corresponding user equipments and that are of the M pieces of index information along the preset direction to generate the first sequence; determining a sequence number i of the index information of the user equipment in the first sequence, where $1 \leq i \leq M$; and if the first order is the same as the arrangement order of the first sequence, determining that the $i^{th}$ piece of power control information starting from the first power control subfield in the preset direction is the power control information of the user equipment; or if the first order is opposite to the arrangement order of the first sequence, determining that the $i^{th}$ piece of power control information starting from the last power control subfield in the preset direction is the power control information of the user equipment.

For example, the first order is 1 3 5, the preset direction is from left to right, and the first sequence constituted by sequentially arranging all of the pieces of index information that instruct to carry power control information of corresponding user equipments and that are of the M pieces of index information along the preset direction is 1 3 5. If the user equipment is No. 5, it is determined that a sequence number of the index information of the user equipment in the first sequence is 3. When the first order is the same as the arrangement order of the first sequence, determining that third power control information starting from the first power control subfield from left to right is the power control information of the user equipment; or when the first order is opposite to the arrangement order of the first sequence, determining that third power control information starting from the last power control subfield from left to right is the power control information of the user equipment.

Figure 8:
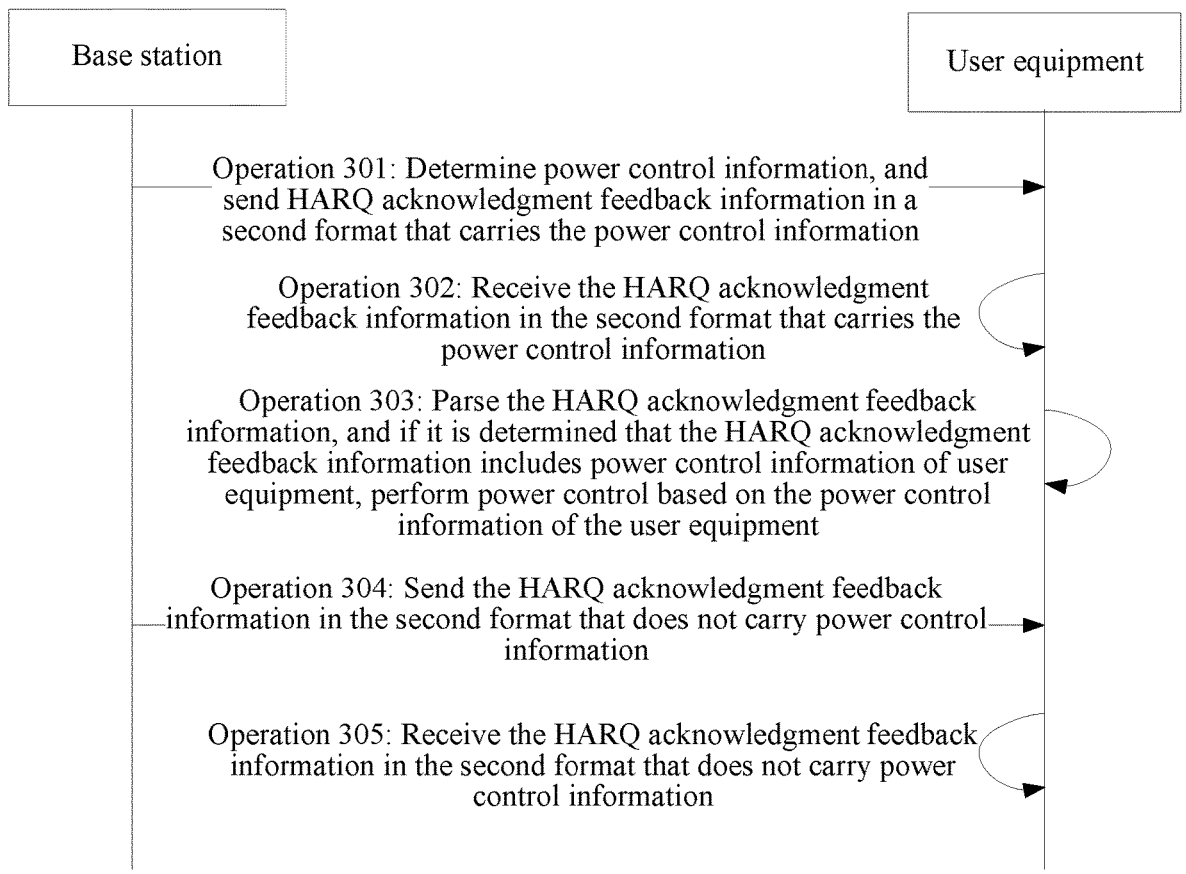
FIG. 8 is a flowchart of a sixth uplink power control method according to an embodiment of the present disclosure.

Optionally, referring to FIG. 8, the method further includes the following operation.

Operation 304: The base station sends HARQ acknowledgment feedback information in a second format to the X user equipments, where the N power control subfields do not carry power control information of user equipment.

That is, if it is determined that user equipment on which power control is intended to be performed does not exist, the base station sends the HARQ acknowledgment feedback information in the second format to the X user equipments, and the N power control subfields included in the acknowledgment feedback information in the second format are filled with invalid information.

Further, if the base station determines that user equipment on which power control is intended to be performed does not exist, and a relatively large quantity of acknowledgment information of the user equipment in the HARQ acknowledgment feedback information needs to be sent, valid information may be in the special acknowledgment field, and the special acknowledgment field does not carry power control information of user equipment.

Correspondingly, the method further includes the following operation.

Operation 305: The user equipment receives the HARQ acknowledgment feedback information in the second format sent by the base station to the X user equipments, where the HARQ acknowledgment feedback information in the second format includes the second acknowledgment feedback field, where the N power control subfields do not carry power control information of user equipment.

The HARQ acknowledgment feedback information in the second format that does not carry power control information of user equipment in the N power control subfields is sent by the base station after it is determined that user equipment on which power control is intended to be performed does not exist.

It should be noted that, operation 301 and operation 304 are not performed in an order. Whether the HARQ acknowledgment feedback information in the second format sent by the base station to the X user equipments carries the power control information of the user equipment or does not carry power control information of user equipment is determined by the base station based on a result of determining whether user equipment on which power control is intended to be performed exists. That is, when user equipment on which power control is intended to be performed exists, the base station sends the HARQ acknowledgment feedback information in the second format that carries the power control information of the user equipment; or when user equipment on which power control is intended to be performed does not exist, the base station sends the HARQ acknowledgment feedback information in the second format that does not carry power control information of user equipment.

Figure 9:
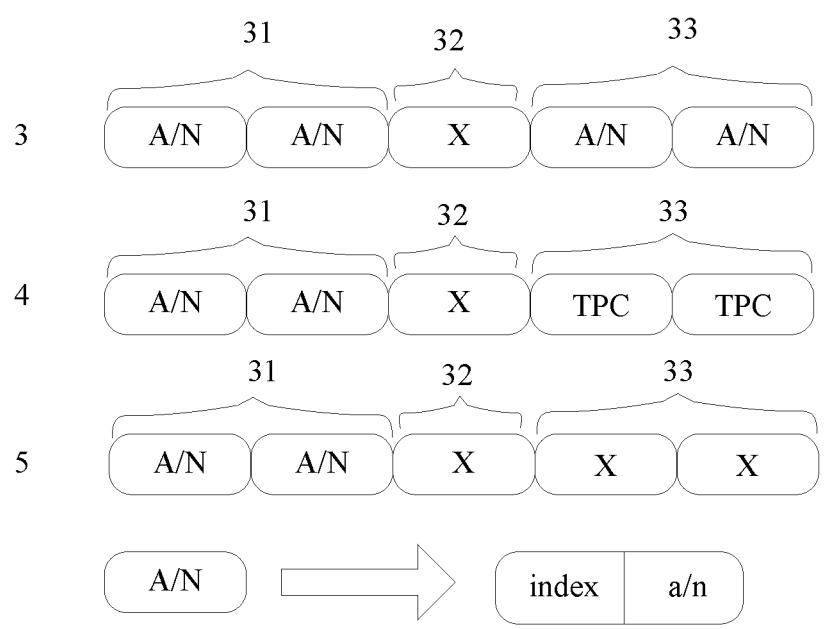
FIG. 9 is a schematic structural diagram of another acknowledgment feedback information according to an embodiment of the present disclosure.

For example, as shown in FIG. 9, HARQ acknowledgment feedback information 3 in the second format includes a first field 31, a special acknowledgment field 32, and a second field 33. It is assumed that the first field 31 includes two subfields, the special acknowledgment field 32 includes one subfield, and the second field 33 includes two power control subfields. HARQ acknowledgment feedback information 4 in the second format carries the power control information of the user equipment, and HARQ acknowledgment feedback information 5 in the second format does not carry power control information of user equipment. In the diagram, A/N is used to indicate a subfield of the first field 31, and each subfield may include one piece of index information and one piece of acknowledgment information. As shown in the diagram, index is used to indicate index information, a/n is used to indicate one piece of acknowledgment information, TPC is used to indicate a power control subfield in the second field 12, and X is used to indicate a subfield filled with invalid information.

Figure 10:
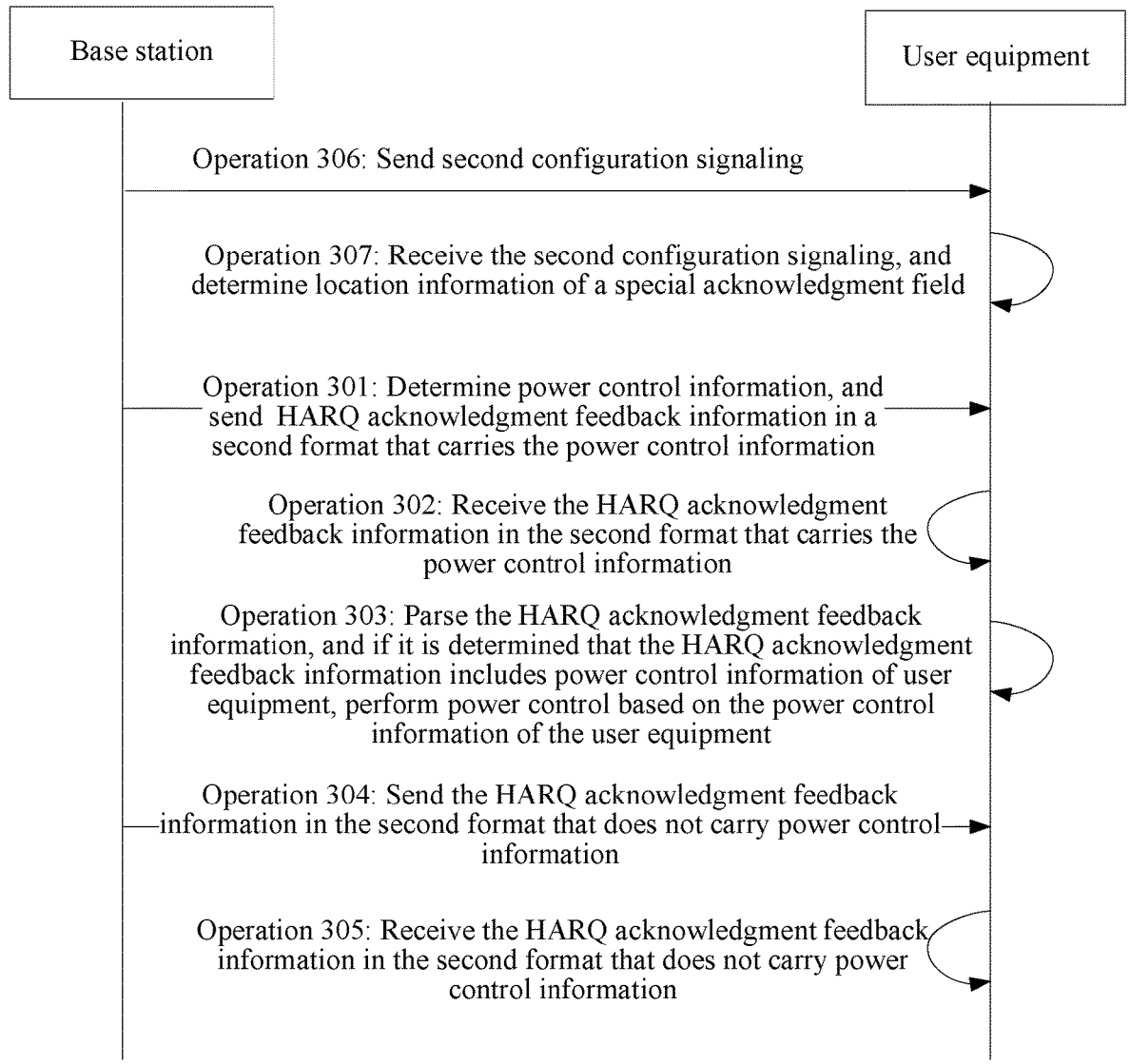
FIG. 10 is a flowchart of a seventh uplink power control method according to an embodiment of the present disclosure.

Optionally, referring to FIG. 10, before operation 301, the method further includes the following operation.

Operation 306: The base station sends second configuration signaling to the X user equipments, where the second configuration signaling includes location information of the special acknowledgment field.

The location information of the special acknowledgment field may be a sequence number of the special acknowledgment field in the acknowledgment feedback information. In actual application, the location information of the special acknowledgment field may also be another information. This is not limited in this embodiment of the present disclosure.

Correspondingly, the method further includes the following operation.

Operation 307: The user equipment receives the second configuration signaling sent by the base station to the X user equipments, where the second configuration signaling includes the location information of the special acknowledgment field.

Correspondingly, an operation of determining, by the user equipment, that the invalid information is in the special acknowledgment field in operation 303 may be: the user equipment determines a target location of the special acknowledgment field in the HARQ acknowledgment feedback information in the second format based on the location information of the special acknowledgment field, and if information on the target location is invalid information, determines that the invalid information is in the special acknowledgment field; or if information on the target location is valid information, determines that the HARQ acknowledgment feedback information in the second format does not carry power control information of user equipment, and therefore performs no subsequent operation.

Based on the uplink power control method provided in this embodiment of the present disclosure, the base station determines the power control information, where the power control information is used to control the power of the user equipment; and sends the HARQ acknowledgment feedback information in the second format to the X user equipments, where the HARQ acknowledgment feedback information in the second format carries the power control information of the at least one of the X user equipments, the X user equipments contend for use of the same transmission resource, and X is an integer greater than or equal to 1. When the user equipment receives the HARQ acknowledgment feedback information in the second format, the user equipment parses the HARQ acknowledgment feedback information in the second format; and if it is determined that the invalid information is in the special acknowledgment field, and it is determined that the HARQ acknowledgment feedback information includes the power control information of the user equipment, performs power control on the user equipment based on the power control information of the user equipment. Therefore, based on original signaling, the power control information of the user equipment is carried by using an idle bit in original acknowledgment feedback information, and the base station performs uplink closed-loop power control on the user equipment.

Figure 11:
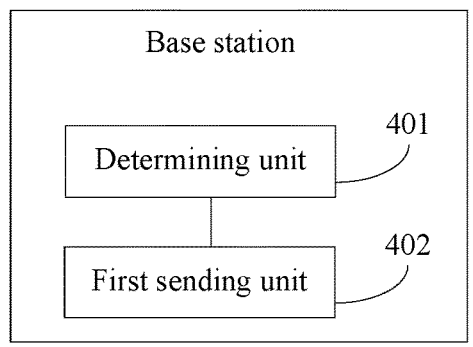
FIG. 11 is a schematic structural diagram of a first base station according to an embodiment of the present disclosure.

FIG. 11 is a schematic structural diagram of a base station according to an embodiment of the present disclosure. Referring to FIG. 11, the base station includes:

a determining unit 401, configured to determine power control information, where the power control information is used to control a power of user equipment; and a first sending unit 402, configured to send HARQ acknowledgment feedback information to X user equipments, where the HARQ acknowledgment feedback information carries power control information of at least one of the X user equipments, the X user equipments contend for use of a same transmission resource, and X is an integer greater than or equal to 1.

Optionally, the first sending unit 402 is configured to:

send HARQ acknowledgment feedback information in a first format to the X user equipments, where the HARQ acknowledgment feedback information in the first format includes a first acknowledgment feedback field and a power control field, the power control field includes N power control subfields, the N power control subfields carry power control information of S user equipments, and one power control subfield is used to carry power control information of one user equipment at most; and the first acknowledgment feedback field includes index information of M user equipments, the index information of the M user equipments is used to indicate a correspondence between the power control subfields and the power control information of the S user equipments, and $1 \leq S \leq N \leq M$.

Optionally, the first sending unit 402 is configured to:

send HARQ acknowledgment feedback information in a second format to the X user equipments, where the HARQ acknowledgment feedback information in the second format includes L subfields, and includes a first field, a special acknowledgment field, and a second field, the special acknowledgment field includes T subfields, and invalid information is in the special acknowledgment field; the second field includes N power control subfields, the N power control subfields carry power control information of S user equipments, and one power control subfield is used to carry power control information of one user equipment at most; and the first field includes W subfields, the W subfields carry index information of M user equipments, the index information of the M user equipments is used to indicate a correspondence between the power control subfields and the power control information of the S user equipments, $1 \leq S \leq N \leq W$, $1 \leq S \leq M \leq W$, and $L=N+T+W$.

Optionally, that the index information of the M user equipments is used to indicate the correspondence between the power control subfields and the power control information of the S user equipments is:

the power control information of the S user equipments is sequentially arranged in a first order along a preset direction of the N power control subfields starting from the first power control subfield in the preset direction, where the first order is the same as or opposite to an arrangement order of a first sequence constituted by pieces of index information that instruct to carry power control information of corresponding user equipments in the preset direction and that are among M pieces of index information.

Optionally, when N is equal to S, the N power control subfields carry power control information of N user equipments; or when N is greater than S, the N power control subfields carry the power control information of the S user equipments, and N−S power control subfields are filled with invalid information.

Figure 12:
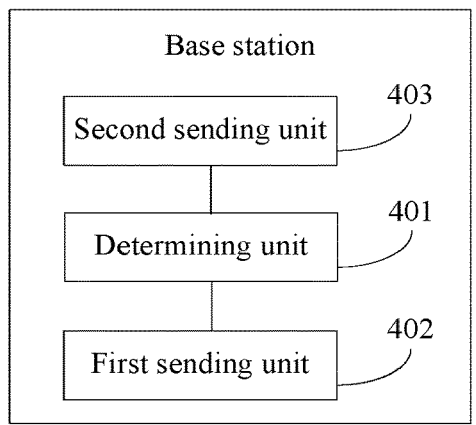
FIG. 12 is a schematic structural diagram of a second base station according to an embodiment of the present disclosure.

Optionally, referring to FIG. 12, the base station further includes:

a second sending unit 403, configured to send scheduling signaling to the X user equipments, where the scheduling signaling is used to indicate a format of the HARQ acknowledgment feedback information.

Optionally, the scheduling signaling includes a preset indication bit, and the format of the HARQ acknowledgment feedback information is indicated by using the preset indication bit; or the scheduling signaling is scrambled by using different preset scrambling codes, and the different preset scrambling codes correspond to formats of the HARQ acknowledgment feedback information.

Figure 13:
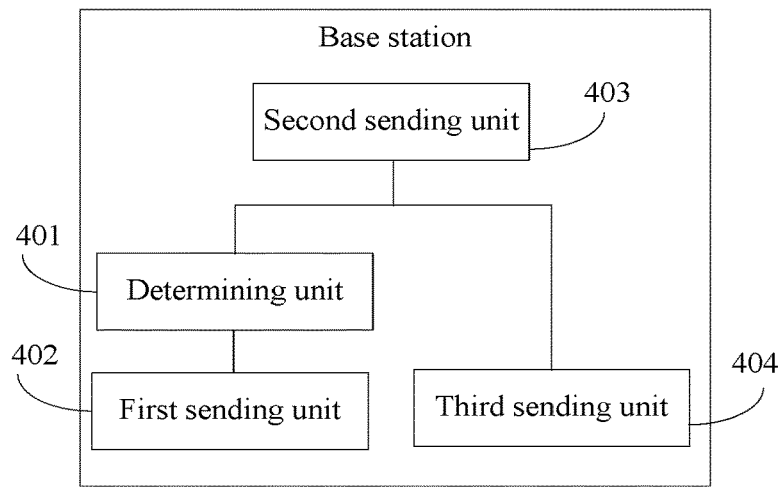
FIG. 13 is a schematic structural diagram of a third base station according to an embodiment of the present disclosure.

Optionally, referring to FIG. 13, the base station further includes:

a third sending unit 404, configured to: if the scheduling signaling includes a preset indication bit, send, when the preset indication bit is a first value, HARQ acknowledgment feedback information in a third format to the X user equipments, where the HARQ acknowledgment feedback information in the third format includes a second acknowledgment feedback field; or if the scheduling signaling is scrambled by using different preset scrambling codes, send, when a preset scrambling code is a first scrambling code, HARQ acknowledgment feedback information in a third format to the X user equipments, where the HARQ acknowledgment feedback information in the third format includes a second acknowledgment feedback field.

Figure 14:
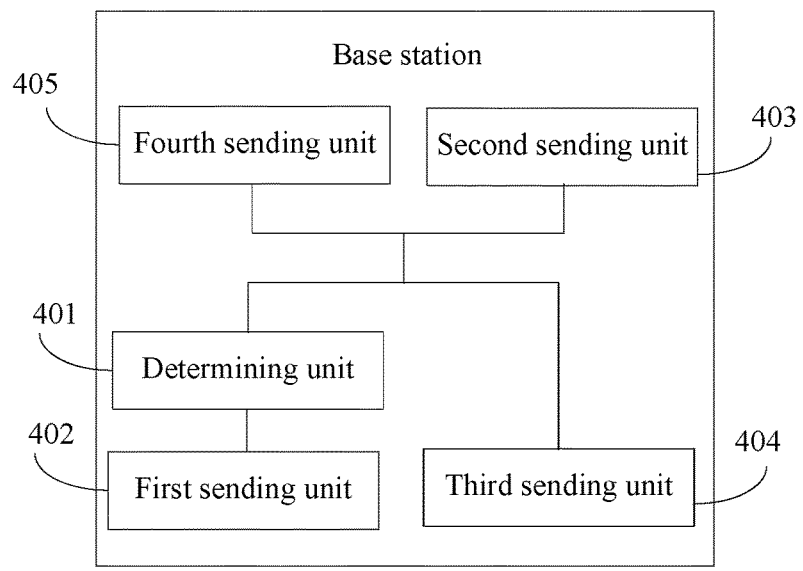
FIG. 14 is a schematic structural diagram of a fourth base station according to an embodiment of the present disclosure.

Optionally, referring to FIG. 14, the base station further includes:

a fourth sending unit 405, configured to send first configuration signaling to the X user equipments, where the first configuration signaling includes a subfield quantity of the power control field of the acknowledgment feedback information in the first format.

Figure 15:
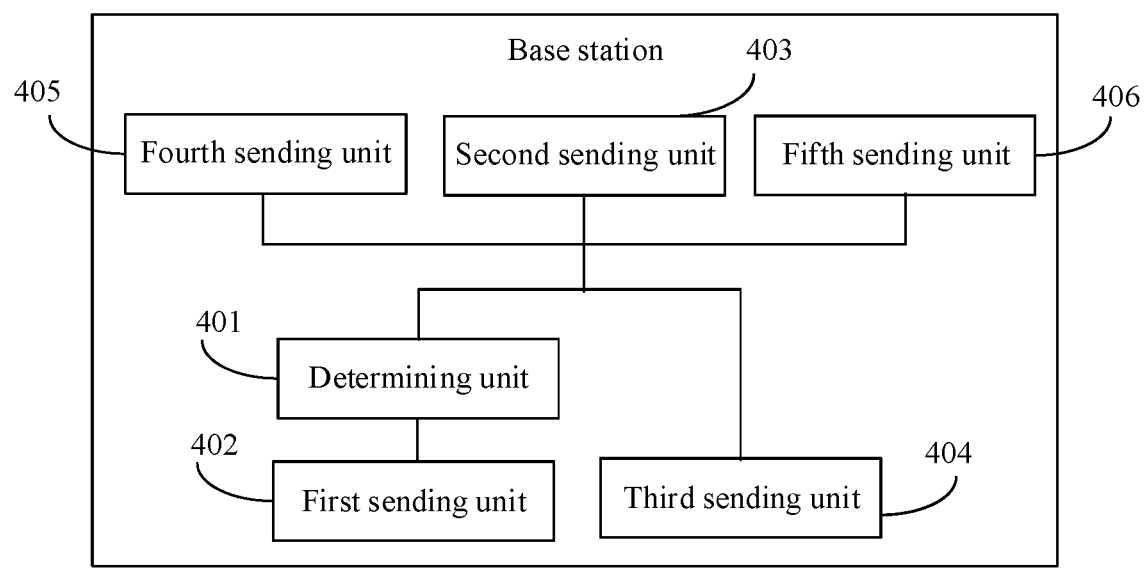
FIG. 15 is a schematic structural diagram of a fifth base station according to an embodiment of the present disclosure.

Optionally, referring to FIG. 15, the base station further includes:

a fifth sending unit 406, configured to: when valid information is in the special acknowledgment field, send the HARQ acknowledgment feedback information in the second format to the X user equipments, where the N power control subfields do not carry power control information of user equipment.

Figure 16:
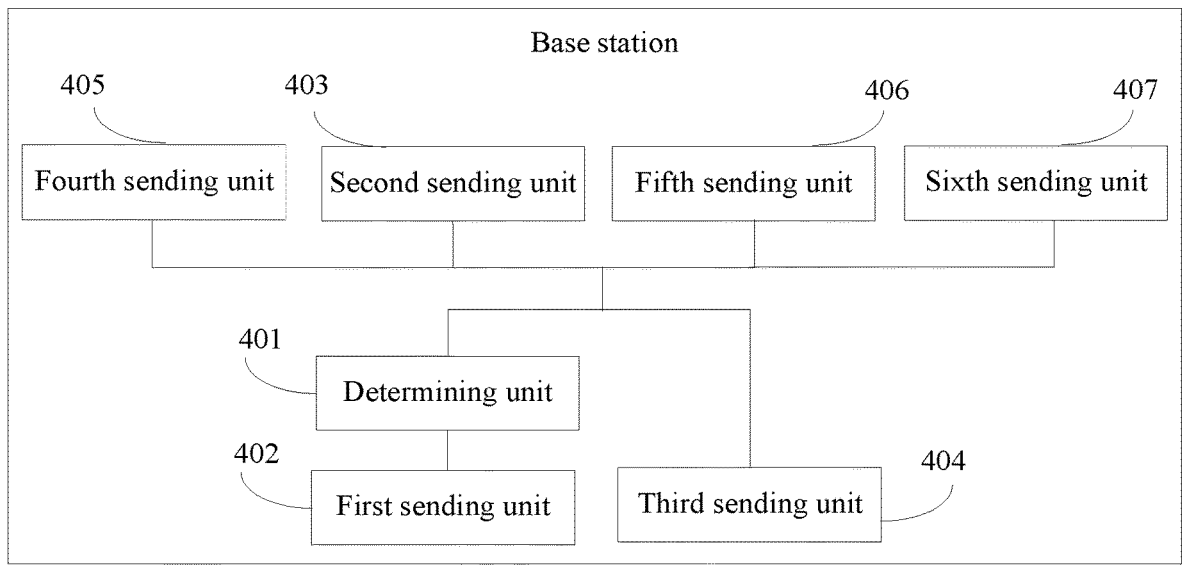
FIG. 16 is a schematic structural diagram of a sixth base station according to an embodiment of the present disclosure.

Optionally, referring to FIG. 16, the base station further includes:

a sixth sending unit 407, configured to send second configuration signaling to the X user equipments, where the second configuration signaling includes location information of the special acknowledgment field.

Based on the base station provided in this embodiment of the present disclosure, the base station sends the HARQ acknowledgment feedback information to the X user equipments, where the HARQ acknowledgment feedback information carries the power control information of the at least one of the X user equipments, the X user equipments contend for use of a same transmission resource, and X is an integer greater than or equal to 1, so that when receiving the acknowledgment feedback information of the X user equipments, the user equipment parses the acknowledgment feedback information of the X user equipments, and if it is determined that the acknowledgment feedback information of the X user equipments includes the power control information of the user equipment, based on the power control information of the user equipment, performs power control on the user equipment. Therefore, the base station performs uplink closed-loop power control on the user equipment based on maintained original signaling.

Figure 17:
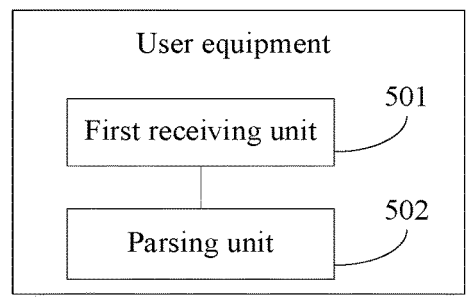
FIG. 17 is a schematic structural diagram of first user equipment according to an embodiment of the present disclosure.

FIG. 17 shows user equipment according to an embodiment of the present disclosure. Referring to FIG. 17, the user equipment includes:

a first receiving unit, configured to receive acknowledgment feedback information of X user equipments sent by a base station to the X user equipments, where the acknowledgment feedback information of the X user equipments carries power control information of at least one of the X user equipments, the X user equipments contend for use of a same transmission resource, and X is an integer greater than or equal to 1; and a parsing unit 502, configured to parse the HARQ acknowledgment feedback information; and if it is determined that the HARQ acknowledgment feedback information includes the power control information of the user equipment, perform power control on the user equipment based on the power control information of the user equipment.

Optionally, the first receiving unit 501 is configured to:

receive HARQ acknowledgment feedback information in a first format sent by the base station to the X user equipments, where the HARQ acknowledgment feedback information in the first format includes a first acknowledgment feedback field and a power control field, the power control field includes N power control subfields, the N power control subfields carry power control information of S user equipments, and one power control subfield is used to carry power control information of one user equipment at most;

and the first acknowledgment feedback field includes index information of M user equipments, the index information of the M user equipments is used to indicate a correspondence between the power control subfields and the power control information of the S user equipments, and 1≤S≤N≤M.

Correspondingly, the parsing unit 502 is configured to:

query index information corresponding to the user equipment from the index information of the M user equipments included in the first acknowledgment feedback field; and determine, based on the index information corresponding to the user equipment, and the correspondence that is between the power control subfields and the power control information of the S user equipments and that is indicated by the index information of the M user equipments, whether the power control subfields include the power control information of the user equipment.

Optionally, the first receiving unit 501 is configured to:

receive HARQ acknowledgment feedback information in a second format sent by the base station to the X user equipments, where the HARQ acknowledgment feedback information in the second format includes L subfields, and includes a first field, a special acknowledgment field, and a second field, the special acknowledgment field includes T subfields, and invalid information is in the special acknowledgment field; the second field includes N power control subfields, the N power control subfields carry power control information of S user equipments, and one power control subfield is used to carry power control information of one user equipment at most; and the first field includes W subfields, the W subfields carry index information of M user equipments, the index information of the M user equipments is used to indicate a correspondence between the power control subfields and the power control information of the S user equipments, 1≤S≤N≤W, 1≤S≤M≤W, and L=N+T+W.

Correspondingly, the parsing unit 502 is configured to:

determine whether the first field includes the index information of the user equipment; and if it is determined that the first field includes the index information of the user equipment and it is determined that an invalid information is in the special acknowledgment field, determine, based on the index information corresponding to the user equipment, and the correspondence that is between the power control subfields and the power control information of the S user equipments and that is indicated by the index information of the M user equipments, whether the power control subfields include the power control information of the user equipment.

Optionally, that the index information of the M user equipments is used to indicate the correspondence between the power control subfields and the power control information of the S user equipments is: the power control information of the S user equipments is sequentially arranged in a first order along a preset direction of the N power control subfields starting from the first power control subfield in the preset direction, where the first order is the same as or opposite to an arrangement order of a first sequence constituted by pieces of index information that instruct to carry power control information of corresponding user equipments in the preset direction and that are among M pieces of index information.

Correspondingly, the parsing unit 502 is further configured to:

if the index information corresponding to the user equipment indicates that the power control subfields carry the power control information of the user equipment, sequentially arrange all of the pieces of index information that instruct to carry power control information of corresponding user equipments and that are of the M pieces of index information along the preset direction to generate the first sequence;

determine a sequence number i of the index information of the user equipment in the first sequence, where $1 \leq i \leq M$; and if the first order is the same as the arrangement order of the first sequence, determine that the $i^{th}$ piece of power control information starting from the first power control subfield in the preset direction is the power control information of the user equipment; or if the first order is opposite to the arrangement order of the first sequence, determine that the $i^{th}$ piece of power control information starting from the last power control subfield in the preset direction is the power control information of the user equipment.

Figure 18:
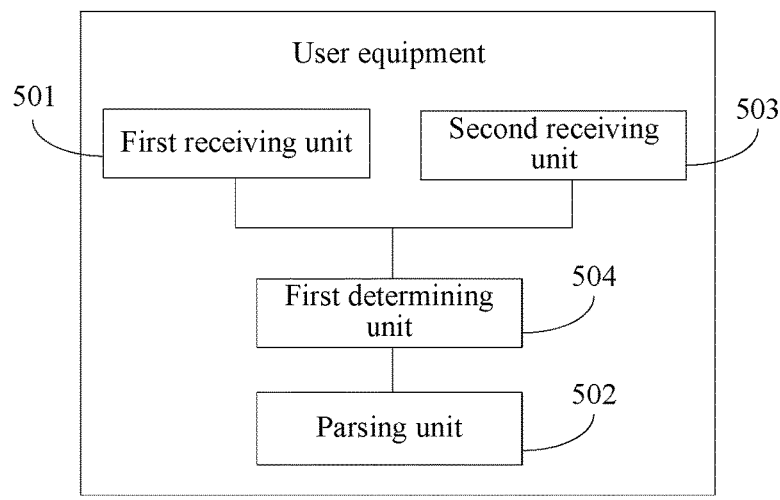
FIG. 18 is a schematic structural diagram of second user equipment according to an embodiment of the present disclosure.

Optionally, referring to FIG. 18, the user equipment further includes:

a second receiving unit 503, configured to receive scheduling signaling sent by the base station to the X user equipments, where the scheduling signaling is used to indicate a format of the HARQ acknowledgment feedback information.

Correspondingly, the user equipment further includes:

a first determining unit 504, configured to determine the format of the HARQ acknowledgment feedback information based on the scheduling signaling.

Optionally, the scheduling signaling includes a preset indication bit, and the format of the HARQ acknowledgment feedback information is indicated by using the preset indication bit. Correspondingly, the first determining unit is configured to: when the preset indication bit is a first value, determine that the format of the HARQ acknowledgment feedback information is a third format, or when the preset indication bit is a second value, determine that the format of the HARQ acknowledgment feedback information is the first format; or the scheduling signaling is scrambled by using different preset scrambling codes, and the different preset scrambling codes correspond to formats of the HARQ acknowledgment feedback information; and correspondingly, the first determining unit is configured to: if a preset scrambling code is a first scrambling code, determine that the format of the HARQ acknowledgment feedback information is a third format, or if a preset scrambling code is a second scrambling code, determine that the format of the HARQ acknowledgment feedback information is the first format.

Figure 19:
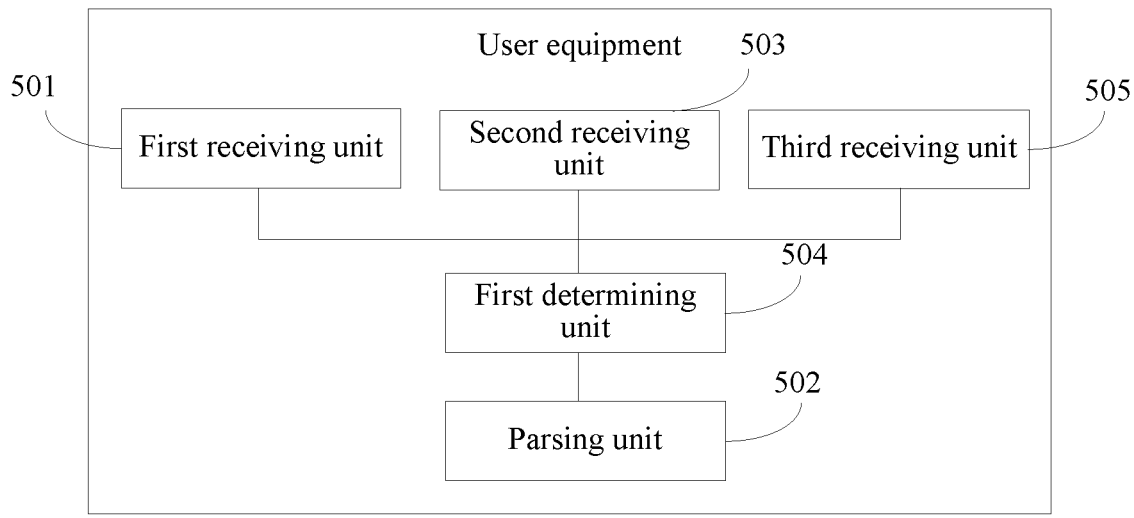
FIG. 19 is a schematic structural diagram of third user equipment according to an embodiment of the present disclosure.

Optionally, referring to FIG. 19, the user equipment further includes:

a third receiving unit 505, configured to receive the acknowledgment feedback information in the third format sent by the base station to the X user equipments, where the acknowledgment feedback information in the third format includes a second acknowledgment feedback field, and the acknowledgment feedback information in the third format is sent by the base station after it is determined that the user equipment does not exist.

Figure 20:
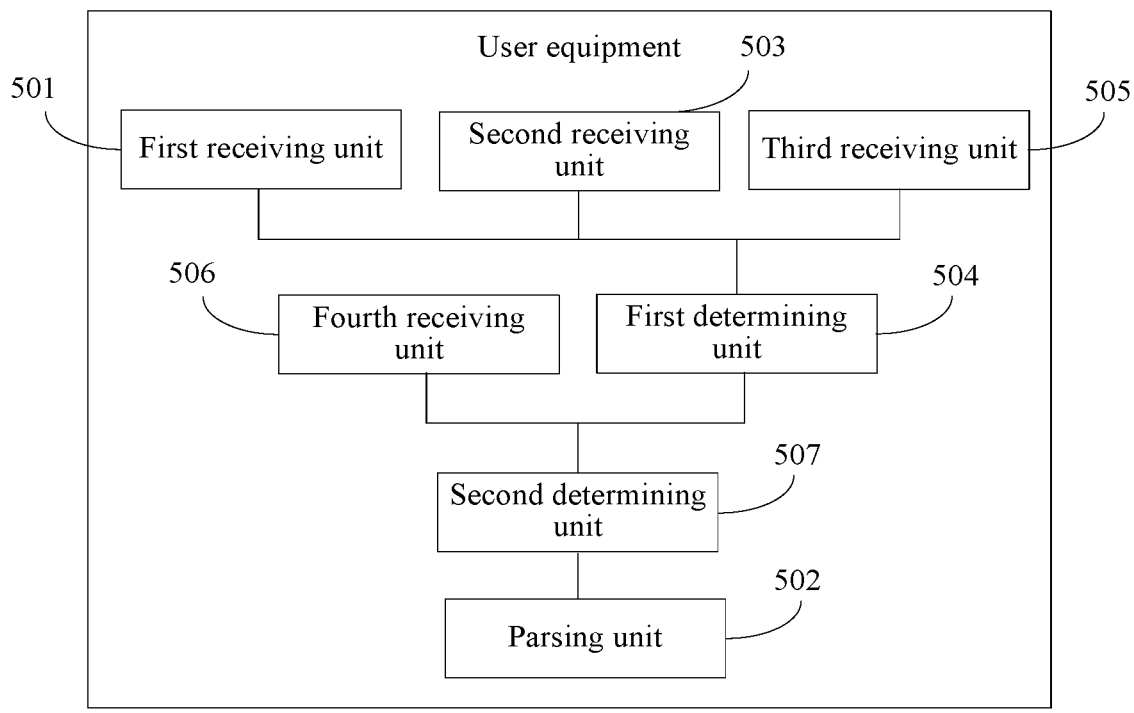
FIG. 20 is a schematic structural diagram of fourth user equipment according to an embodiment of the present disclosure.

Optionally, referring to FIG. 20, the user equipment further includes:

a fourth receiving unit 506, configured to receive first configuration signaling sent by the base station to the X user equipments, where the first configuration signaling includes a subfield quantity of power control field.

Correspondingly, the user equipment further includes:

a second determining unit 507, configured to determine a length of the HARQ acknowledgment feedback information in the first format based on the subfield quantity of the power control field.

Figure 21:
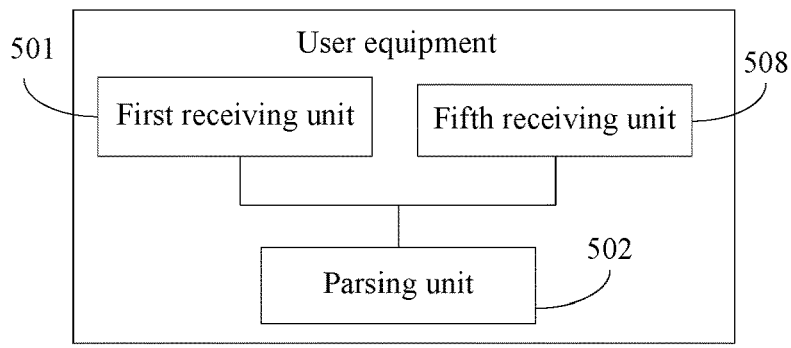
FIG. 21 is a schematic structural diagram of fifth user equipment according to an embodiment of the present disclosure.

Optionally, referring to FIG. 21, the user equipment further includes:

a fifth receiving unit 508, configured to receive HARQ acknowledgment feedback information in a second format sent by the base station to the X user equipments, where the N power control subfields do not carry power control information of user equipment.

Figure 22:
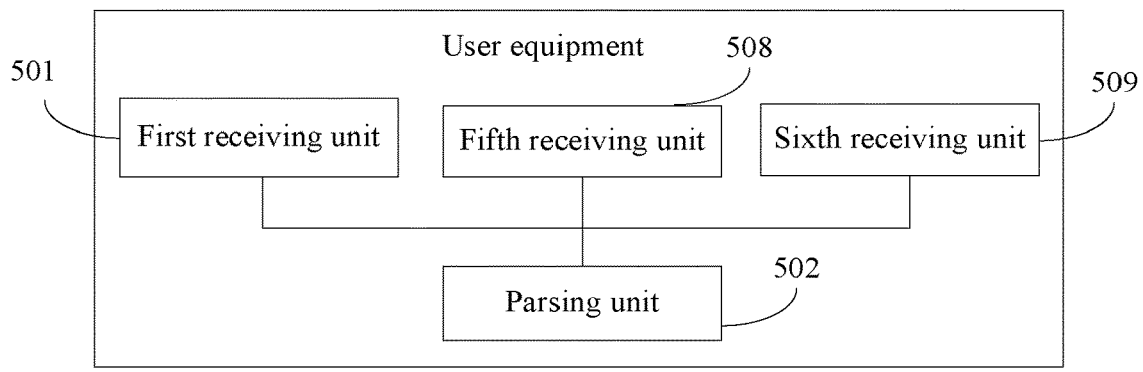
FIG. 22 is a schematic structural diagram of sixth user equipment according to an embodiment of the present disclosure.

Optionally, referring to FIG. 22, the user equipment further includes:

a sixth receiving unit 509, configured to receive second configuration signaling sent by the base station to the X user equipments, where the second configuration signaling includes location information of the special acknowledgment field.

Correspondingly, the parsing unit 502 is further configured to:

determine a target location of the special acknowledgment field in the HARQ acknowledgment feedback information based on the location information of the special acknowledgment field, and if information on the target location is invalid information, determine that the invalid information is in the special acknowledgment field.

Based on the user equipment provided in this embodiment of the present disclosure, the user equipment receives the HARQ acknowledgment feedback information sent by the base station to the X user equipments, where the HARQ acknowledgment feedback information carries the power control information of the at least one of the X user equipments, the X user equipments contend for use of the same transmission resource, and X is an integer greater than or equal to 1; parses the HARQ acknowledgment feedback information; and if it is determined that the HARQ acknowledgment feedback information includes the power control information of the user equipment, performs power control on the user equipment based on power control information of the user equipment. Therefore, the base station performs uplink closed-loop power control on the user equipment based on maintained original signaling.

Figure 23:
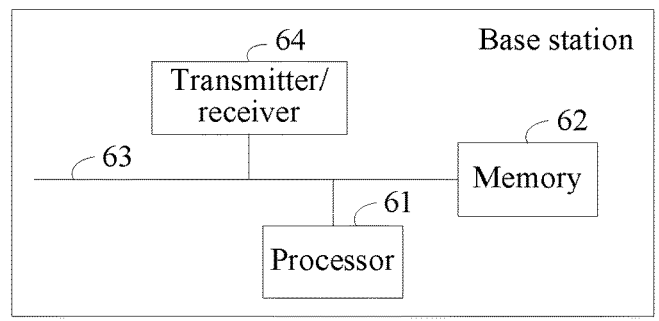
FIG. 23 is a schematic structural diagram of another base station according to an embodiment of the present disclosure.

FIG. 23 shows a base station according to an embodiment of the present disclosure. The base station includes: a processor 61, a memory 62, a system bus 63, and a transmitter/receiver 64.

Persons of ordinary skill in the art may understand that, a structure shown in FIG. 23 is only an example that does not limit a structure of the base station. For example, the base station may further include more or less components than those shown in FIG. 23, or has a configuration different from that shown in FIG. 23.

Components of the base station are described below.

The memory 62 is configured to store a computer-executable instruction, the transmitter/receiver 64 is configured to send information or signaling to another device, and is configured to receive information or signaling sent by the another device, the processor 61 is connected to the memory 62 and the transmitter/receiver 64 by using the system bus 63, and when the base station runs, the processor 61 executes, by using the transmitter/receiver 64, the computer-executable instruction stored in the memory 62, so that the base station performs the operations of the base station in the uplink power control method shown in any one of FIG. 2, FIG. 4, FIG. 5, FIG. 6, FIG. 7, FIG. 8, and FIG. 10.

For example, when the base station performs the foregoing uplink power control method, the processor 61 may be configured to determine power control information, where the power control information is used to control a power of user equipment; and the transmitter/receiver 64 may be configured to send HARQ acknowledgment feedback information to X user equipments, where the HARQ acknowledgment feedback information may be HARQ acknowledgment feedback information in a first format, HARQ acknowledgment feedback information in a second format, or HARQ acknowledgment feedback information in a third format, and specific HARQ acknowledgment feedback information in different formats is described in the foregoing embodiments. Details are not described herein again in this embodiment of the present disclosure.

Further, the transmitter/receiver 64 may be further configured to send scheduling signaling to the X user equipments, where the scheduling signaling is used to indicate a format of the HARQ acknowledgment feedback information.

Further, the transmitter/receiver 64 may be further configured to send first configuration signaling to the X user equipments, where the first configuration signaling includes a subfield quantity of the power control field of the HARQ acknowledgment feedback information in the first format; or the transmitter/receiver 64 may be further configured to send second configuration signaling to the X user equipments, where the second configuration signaling includes location information of the special acknowledgment field.

For the performing, by the base station, the foregoing uplink power control method, refer to the related description in the embodiment shown in any one of FIG. 2, FIG. 4, FIG. 5, FIG. 6, FIG. 7, FIG. 8, and FIG. 10. Details are not described herein again.

This embodiment further provides a storage medium, and the storage medium may include the memory 62.

The processor 61 may be a central processing unit (CPU). The processor 61 may further be another general purpose processor, a digital signal processor (DSP), an application-specific integrated circuit (ASIC), an field programmable gate array (FPGA), another programmable logic device, a discrete gate, a transistor logic device, or a discrete hardware component, or the like. The general purpose processor may be a microprocessor, or the processor may be any normal processor, or the like.

The processor 61 may be a dedicated processor, and the dedicated processor may include at least one of a baseband processing chip, a radio frequency processing chip, and the like. Further, the dedicated processor may further include a chip that has another dedicated processing function of the base station.

The memory 62 may include a volatile memory, for example, a random access memory (RAM). The memory 62 may also include a non-volatile memory, for example, a read-only memory (ROM), a flash memory, an hard disk drive (HDD), or an solid state drive (SSD). The memory 62 may also include a combination of the foregoing memories.

The system bus 63 may include a data bus, a power bus, a control bus, a signal status bus, and the like. In this embodiment, for a purpose of clear description, all buses are marked as the system bus 63 in FIG. 23.

The transmitter/receiver 64 may be a transceiver on the base station. The transceiver may be a radio transceiver. For example, the radio transceiver may be an antenna of the base station or the like. The processor 61 receives data from or transmits data to another device such as a terminal by using the transmitter/receiver 64.

In a specific implementation process, all the operations of the base station in the method process shown in any one of FIG. 2, FIG. 4, FIG. 5, FIG. 6, FIG. 7, FIG. 8, and FIG. 10 may be implemented by executing the computer-executable instruction in a software form stored in the memory 62 by the processor 61 in a hardware form. To avoid repetition, details are not described herein again.

Based on the base station provided in this embodiment of the present disclosure, the base station sends the HARQ acknowledgment feedback information to the X user equipments, where the HARQ acknowledgment feedback information carries the power control information of the at least one of the X user equipments, the X user equipments contend for use of a same transmission resource, and X is an integer greater than or equal to 1, so that when receiving the acknowledgment feedback information of the X user equipments, the user equipment parses the acknowledgment feedback information of the X user equipments, and if it is determined that the acknowledgment feedback information of the X user equipments includes the power control information of the user equipment, based on the power control information of the user equipment, performs power control on the user equipment. Therefore, the base station performs uplink closed-loop power control on the user equipment based on maintained original signaling.

Figure 24:
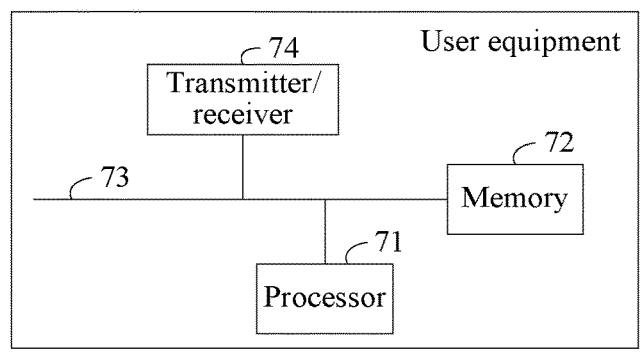
FIG. 24 is a schematic structural diagram of another user equipment according to an embodiment of the present disclosure.

FIG. 24 shows user equipment according to an embodiment of the present disclosure. The user equipment includes: a processor 71, a memory 72, a system bus 73, and a transmitter/receiver 74.

Persons of ordinary skill in the art may understand that, a structure shown in FIG. 24 is only an example that does not limit a structure of the user equipment. For example, the user equipment may further include more or less components than those shown in FIG. 24, or has a configuration different from that shown in FIG. 24.

Components of the user equipment are described below.

The memory 72 is configured to store a computer-executable instruction, the transmitter/receiver 74 is configured to send information or signaling to another device, and is configured to receive information or signaling sent by the another device, the processor 71 is connected to the memory 72 and the transmitter/receiver 74 by using the system bus 73, and when the user equipment runs, the processor 71 executes, by using the transmitter/receiver 74, the computer-executable instruction stored in the memory 72, so that the user equipment performs the operations of the user equipment in the method process shown in any one of FIG. 2, FIG. 4, FIG. 5, FIG. 6, FIG. 7, FIG. 8, and FIG. 10.

For example, when the user equipment performs the foregoing uplink power control method, the transmitter/receiver 74 may be configured to receive HARQ acknowledgment feedback information sent by the base station to X user equipments, where the HARQ acknowledgment feedback information may be HARQ acknowledgment feedback information in a first format, HARQ acknowledgment feedback information in a second format, or HARQ acknowledgment feedback information in a third format, and specific HARQ acknowledgment feedback information in different formats is described in the foregoing embodiments. Details are not described herein again in this embodiment of the present disclosure.

The processor 71 may be configured to parse the HARQ acknowledgment feedback information; and if it is determined that the HARQ acknowledgment feedback information includes the power control information of the user equipment, perform power control on the user equipment based on the power control information of the user equipment.

Further, the transmitter/receiver 74 may be further configured to receive scheduling signaling sent by the base station to the X user equipments, where the scheduling signaling is used to indicate a format of the HARQ acknowledgment feedback information; and correspondingly, the processor 71 may be further configured to determine the format of the HARQ acknowledgment feedback information based on the scheduling signaling.

Further, the transmitter/receiver 74 may be further configured to receive first configuration signaling sent by the base station to the X user equipments, where the first configuration signaling includes a subfield quantity of power control field; and correspondingly, the processor 71 may be further configured to determine a length of the HARQ acknowledgment feedback information in the first format based on the subfield quantity of the power control field; or the transmitter/receiver 74 may be further configured to receive second configuration signaling sent by the base station to the X user equipments, where the second configuration signaling includes location information of the special acknowledgment field; and correspondingly, the processor 71 may be further configured to determine a target location of the special acknowledgment field in the HARQ acknowledgment feedback information based on the location information of the special acknowledgment field, and if information on the target location is invalid information, determine that the invalid information is in the special acknowledgment field.

For the specific uplink power control method, refer to the related description in the embodiment shown in any one of FIG. 2, FIG. 4, FIG. 5, FIG. 6, FIG. 7, FIG. 8, and FIG. 10. Details are not described herein again.

This embodiment further provides a storage medium, and the storage medium may include the memory 72.

The processor 71 may be a central processing unit (CPU). The processor 71 may further be another general purpose processor, a digital signal processor (DSP), an application-specific integrated circuit (ASIC), a field programmable gate array (FPGA), another programmable logic device, a discrete gate, a transistor logic device, or a discrete hardware component. The general purpose processor may be a microprocessor, or the processor may be any normal processor, or the like.

The processor 71 may be a dedicated processor, and the dedicated processor may include at least one of a baseband processing chip, a radio frequency processing chip, and the like. Further, the dedicated processor may further include a chip that has another dedicated processing function of a terminal.

The memory 72 may include a volatile memory, for example, a random access memory (RAM). The memory 72 may also include a non-volatile memory, for example, a read-only memory (ROM), a flash memory, a hard disk drive (HDD), or a solid-state drive (SSD). The memory 72 may also include a combination of the foregoing memories.

The system bus 73 may include a data bus, a power bus, a control bus, a signal status bus, and the like. In this embodiment, for a purpose of clear description, all buses are marked as the system bus 73 in FIG. 24.

The transmitter/receiver 74 may be a transceiver on the user equipment. The transceiver may be a radio transceiver. For example, the radio transceiver may be an antenna of the user equipment or the like. The processor 71 receives data from or transmits data to another device such as a base station by using the transmitter/receiver 74.

In a specific implementation process, all the operations of the user equipment in the method process shown in any one of FIG. 2, FIG. 4, FIG. 5, FIG. 6, FIG. 7, FIG. 8, and FIG. 10 may be implemented by executing the computer-executable instruction in a software form stored in the memory 72 by the processor 71 in a hardware form. To avoid repetition, details are not described herein again.

Based on the user equipment provided in this embodiment of the present disclosure, the user equipment receives the HARQ acknowledgment feedback information sent by the base station to the X user equipments, where the HARQ acknowledgment feedback information carries the power control information of the at least one of the X user equipments, the X user equipments contend for use of the same transmission resource, and X is an integer greater than or equal to 1; parses the HARQ acknowledgment feedback information; and if it is determined that the HARQ acknowledgment feedback information includes the power control information of the user equipment, performs power control on the user equipment based on power control information of the user equipment. Therefore, the base station performs uplink closed-loop power control on the user equipment based on maintained original signaling.

An embodiment of the present disclosure provides a communications system, and the communications system includes the base station shown in FIG. 23, and user equipments that belong to a same resource group and that are shown in FIG. 24.

Based on the communications system provided in this embodiment of the present disclosure, each of the user equipments belonging to the same resource group implements the uplink power control method of the embodiments of the present disclosure by performing corresponding operations in the method process shown in any one of FIG. 2, FIG. 4, FIG. 5, FIG. 6, FIG. 7, FIG. 8, and FIG. 10. Correspondingly, the base station implements the uplink power control method of the embodiments of the present disclosure by performing corresponding operations in the method process shown in any one of FIG. 2, FIG. 4, FIG. 5, FIG. 6, FIG. 7, FIG. 8, and FIG. 10.

Based on the communications system provided in this embodiment of the present disclosure, the base station determines the power control information, where the power control information is used to control the power of the user equipment; and sends the HARQ acknowledgment feedback information to the X user equipments, where the HARQ acknowledgment feedback information carries the power control information of the at least one of the X user equipments, the X user equipments contend for use of the same transmission resource, and X is an integer greater than or equal to 1. Then, the user equipment receives the HARQ acknowledgment feedback information sent by the base station to the X user equipments; parses the HARQ acknowledgment feedback information; and if it is determined that the HARQ acknowledgment feedback information includes the power control information of the user equipment, performs power control on the user equipment based on the power control information of the user equipment. Therefore, the base station performs uplink closed-loop power control on the user equipment based on maintained original signaling.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An uplink power control method, wherein the method comprises:

receiving hybrid automatic repeat request (HARQ) acknowledgment feedback information sent by a base station to X user equipment, wherein the HARQ acknowledgment feedback information carries power control information of at least one of the X user equipment, the X user equipment contend for use of a same transmission resource, and X is an integer greater than or equal to 1, wherein the HARQ acknowledgement feedback information includes a field having N power control subfields that carry power control information of S user equipment, and a field containing index information of M user equipment, the index information indicating a correspondence between the power control subfields and the power control information of the S user equipment; and parsing the HARQ acknowledgment feedback information; and if it is determined that the HARQ acknowledgment feedback information comprises the power control information of a user equipment in the at least one of the X user equipment, performing power control on the user equipment based on the power control information of the user equipment.

2. The method according to claim 1, wherein the receiving HARQ acknowledgment feedback information sent by a base station to X user equipment comprises:

receiving HARQ acknowledgment feedback information in a first format sent by the base station to the X user equipment, wherein the HARQ acknowledgment feedback information in the first format comprises a first acknowledgment feedback field and a power control field, the power control field comprises the N power control subfields, and one power control subfield is used to carry power control information of one user equipment at most; and the first acknowledgment feedback field comprises the index information of the M user equipment, and $1 \leq S \leq N \leq M$; and correspondingly, the parsing the HARQ acknowledgment feedback information comprises:

querying index information corresponding to the user equipment from the index information of the M user equipment comprised in the first acknowledgment feedback field; and determining, based on the index information corresponding to the user equipment, and the correspondence that is between the power control subfields and the power control information of the S user equipment and that is indicated by the index information of the M user equipment, whether the power control subfields comprise the power control information of the user equipment.

3. The method according to claim 2, wherein that the index information of the M user equipment is used to indicate the correspondence between the power control subfields and the power control information of the S user equipment is: the power control information of the S user equipment is sequentially arranged in a first order along a preset direction of the N power control subfields starting from the first power control subfield in the preset direction, wherein the first order is the same as or opposite to an arrangement order of a first sequence constituted by pieces of index information that instruct to carry power control information of corresponding user equipment in the preset direction and that are among M pieces of index information; and correspondingly, the determining, based on the index information corresponding to the user equipment, and the correspondence that is between the power control subfields and the power control information of the S user equipment and that is indicated by the index information of the M user equipment, whether the power control subfields comprise the power control information of the user equipment comprises:

if the index information corresponding to the user equipment indicates that the power control subfields carry the power control information of the user equipment, sequentially arranging all of the pieces of index information that instruct to carry power control information of corresponding user equipment and that are of the M pieces of index information along the preset direction to generate the first sequence;

determining a sequence number i of the index information of the user equipment in the first sequence, wherein $1 \leq i \leq M$; and if the first order is the same as the arrangement order of the first sequence, determining that the $i^{th}$ piece of power control information starting from a first power control information subfield in the preset direction is the power control information of the user equipment; or if the first order is opposite to the arrangement order of the first sequence, determining that the $i^{th}$ piece of power control information starting from the last power control information subfield in the preset direction is the power control information of the user equipment.

4. The method according to claim 2, wherein before the receiving HARQ acknowledgment feedback information sent by a base station to X user equipment, the method further comprises:

receiving scheduling signaling sent by the base station to the X user equipment, wherein the scheduling signaling is used to indicate a format of the HARQ acknowledgment feedback information; and correspondingly, before the parsing the HARQ acknowledgment feedback information, the method further comprises:

determining the format of the HARQ acknowledgment feedback information based on the scheduling signaling.

5. The method according to claim 1, wherein the receiving HARQ acknowledgment feedback information sent by a base station to X user equipment comprises:

receiving HARQ acknowledgment feedback information in a second format sent by the base station to the X user equipment, wherein the HARQ acknowledgment feedback information in the second format comprises L subfields, and comprises a first field, a special acknowledgment field, and a second field, the special acknowledgment field comprises T subfields, and invalid information is in the special acknowledgment field; the second field comprises the N power control subfields and one power control subfield is used to carry power control information of one user equipment at most; and the first field comprises W subfields, the W subfields carry the index information of the M user equipment, and $1 \leq S \leq N \leq W$, $1 \leq S \leq M \leq W$, and $L = N + T + W$; and correspondingly, the parsing the HARQ acknowledgment feedback information comprises:

determining whether the first field comprises the index information of the user equipment; and if it is determined that the first field comprises the index information of the user equipment and it is determined that the invalid information is in the special acknowledgment field, determining, based on the index information corresponding to the user equipment, and the correspondence that is between the power control subfields and the power control information of the S user equipment and that is indicated by the index information of the M user equipment, whether the power control subfields comprise the power control information of the user equipment.

6. A base station, wherein the base station comprises:

a determining unit, configured to determine power control information, wherein the power control information is used to control a power of user equipment; and a first sending unit, configured to send hybrid automatic repeat request (HARQ) acknowledgment feedback information to X user equipment, wherein the HARQ acknowledgment feedback information carries power control information of at least one of the X user equipment, the X user equipment contend for use of a same transmission resource, and X is an integer greater than or equal to 1, wherein the HARQ acknowledgement feedback information includes a field having N power control subfields that carry power control information of S user equipment, and a field containing index information of M user equipment, the index information indicating a correspondence between the power control subfields and the power control information of the S user equipment.

7. The base station according to claim 6, wherein the first sending unit is configured to:

send HARQ acknowledgment feedback information in a first format to the X user equipment, wherein the HARQ acknowledgment feedback information in the first format comprises a first acknowledgment feedback field and a power control field, the power control field comprises the N power control subfields, and one power control subfield is used to carry power control information of one user equipment at most; and the first acknowledgment feedback field comprises the index information of the M user equipment, and $1 \leq S \leq N \leq M$.

8. The base station according to claim 7, wherein that the index information of the M user equipment is used to indicate the correspondence between the power control subfields and the power control information of the S user equipment is:

the power control information of the S user equipment is sequentially arranged in a first order along a preset direction of the N power control subfields starting from the first power control subfield in the preset direction, wherein the first order is the same as or opposite to an arrangement order of a first sequence constituted by pieces of index information that instruct to carry power control information of corresponding user equipment in the preset direction and that are among M pieces of index information.

9. The base station according to claim 8, wherein when N is equal to S, the N power control subfields carry power control information of N user equipment; or when N is greater than S, the N power control subfields carry the power control information of the S user equipment, and N−S power control subfields are filled with invalid information.

10. The base station according to claim 6, wherein the first sending unit is configured to:

send HARQ acknowledgment feedback information in a second format to the X user equipment, wherein the HARQ acknowledgment feedback information in the second format comprises L subfields, and comprises a first field, a special acknowledgment field, and a second field, the special acknowledgment field comprises T subfields, and invalid information is in the special acknowledgment field; the second field comprises the N power control subfields, and one power control subfield is used to carry power control information of one user equipment at most; and the first field comprises W subfields, the W subfields carry the index information of the M user equipment, and $1 \leq S \leq N \leq W$, $1 \leq S \leq M \leq W$, and $L=N+T+W$.

11. User equipment, wherein the user equipment comprises:

a processor; and a non-transitory computer-readable storage medium coupled to the processor and storing programming instructions for execution by the processor, the programming instructions instruct the processor to:

receive hybrid automatic repeat request (HARQ) acknowledgment feedback information sent by a base station to X user equipment, wherein the HARQ acknowledgment feedback information carries power control information of at least one of the X user equipment, the X user equipment contend for use of a same transmission resource, and X is an integer greater than or equal to 1, wherein the HARQ acknowledgement feedback information includes a field having N power control subfields that carry power control information of S user equipment, and a field containing index information of M user equipment, the index information indicating a correspondence between the power control subfields and the power control information of the S user equipment; and parse the HARQ acknowledgment feedback information; and if it is determined that the HARQ acknowledgment feedback information comprises the power control information of a user equipment of the at least one of the X user equipment, perform power control on the user equipment based on the power control information of the user equipment.

12. The user equipment according to claim 11, wherein the programming instructions further instruct the processor to:

receive HARQ acknowledgment feedback information in a first format sent by the base station to the X user equipment, wherein the HARQ acknowledgment feedback information in the first format comprises a first acknowledgment feedback field and a power control field, the power control field comprises the N power control subfields, and one power control subfield is used to carry power control information of one user equipment at most; and the first acknowledgment feedback field comprises the index information of M user equipment, and $1 \leq S \leq N \leq M$; and query index information corresponding to the user equipment from the index information of the M user equipment comprised in the first acknowledgment feedback field; and determine, based on the index information corresponding to the user equipment, and the correspondence that is between the power control subfields and the power control information of the S user equipment and that is indicated by the index information of the M user equipment, whether the power control subfields comprise the power control information of the user equipment.

13. The user equipment according to claim 12, wherein that the index information of the M user equipment is used to indicate the correspondence between the power control subfields and the power control information of the S user equipment is: the power control information of the S user equipment is sequentially arranged in a first order along a preset direction of the N power control subfields starting from the first power control subfield in the preset direction, wherein the first order is the same as or opposite to an arrangement order of a first sequence constituted by pieces of index information that instruct to carry power control information of corresponding user equipment in the preset direction and that are among M pieces of index information; and the programming instructions further instruct the processor to:
if the index information corresponding to the user equipment indicates that the power control subfields carry the power control information of the user equipment, sequentially arrange all of the pieces of index information that instruct to carry power control information of corresponding user equipment and that are of the M pieces of index information along the preset direction to generate the first sequence;
determine a sequence number i of the index information of the user equipment in the first sequence, wherein $1 \leq i \leq M$; and
if the first order is the same as the arrangement order of the first sequence, determine that the $i^{th}$ piece of power control information starting from the first power control subfield in the preset direction is the power control information of the user equipment; or
if the first order is opposite to the arrangement order of the first sequence, determine that the $i^{th}$ piece of power control information starting from the last power control subfield in the preset direction is the power control information of the user equipment.

14. The user equipment according to claim 12, wherein the programming instructions further instruct the processor to:
receive scheduling signaling sent by the base station to the X user equipment, wherein the scheduling signaling is used to indicate a format of the HARQ acknowledgment feedback information; and
determine the format of the HARQ acknowledgment feedback information based on the scheduling signaling.

15. The user equipment according to claim 14, wherein the scheduling signaling comprises a preset indication bit, and the format of the HARQ acknowledgment feedback information is indicated by using the preset indication bit; and
correspondingly, the first determining unit is configured to: when the preset indication bit is a first value, determine that the format of the HARQ acknowledgment feedback information is a third format, or when the preset indication bit is a second value, determine that the format of the HARQ acknowledgment feedback information is the first format; or
the scheduling signaling is scrambled by using different preset scrambling codes, and the different preset scrambling codes correspond to formats of the HARQ acknowledgment feedback information; and the programming instructions further instruct the processor to:
if a preset scrambling code is a first scrambling code, determine that the format of the HARQ acknowledgment feedback information is a third format, or if a preset scrambling code is a second scrambling code, determine that the format of the HARQ acknowledgment feedback information is the first format.

16. The user equipment according to claim 15, wherein the programming instructions further instruct the processor to:
receive the HARQ acknowledgment feedback information in the third format sent by the base station to the X user equipment, wherein the HARQ acknowledgment feedback information in the third format comprises a second acknowledgment feedback field.

17. The user equipment according to claim 12, wherein the programming instructions further instruct the processor to:
receive first configuration signaling sent by the base station to the X user equipment, wherein the first configuration signaling comprises a subfield quantity of power control field; and
determine a length of the HARQ acknowledgment feedback information in the first format based on the subfield quantity of the power control field.

18. The user equipment according to claim 11, wherein the programming instructions further instruct the processor to:
receive HARQ acknowledgment feedback information in a second format sent by the base station to the X user equipment, wherein the HARQ acknowledgment feedback information in the second format comprises L subfields, and comprises a first field, a special acknowledgment field, and a second field, the special acknowledgment field comprises T subfields, and invalid information is in the special acknowledgment field; the second field comprises the N power control subfields, and one power control subfield is used to carry power control information of one user equipment at most; and the first field comprises W subfields, the W subfields carry index information of M user equipment, and $1 \leq S \leq N \leq W$, $1 \leq S \leq M \leq W$, and $L=N+T+W$; and
determine whether the first field comprises the index information of the user equipment; and
if it is determined that the first field comprises the index information of the user equipment and it is determined that the invalid information is in the special acknowledgment field, determine, based on the index information corresponding to the user equipment, and the correspondence that is between the power control subfields and the power control information of the S user equipment and that is indicated by the index information of the M user equipment, whether the power control subfields comprise the power control information of the user equipment.

19. The user equipment according to claim 18, wherein the programming instructions further instruct the processor to:
receive HARQ acknowledgment feedback information in a second format sent by the base station to the X user equipment, wherein the N power control subfields do not carry power control information of target user equipment.

20. The user equipment according to claim 18, wherein the programming instructions further instruct the processor to:
receive second configuration signaling sent by the base station to the X user equipment, wherein the second configuration signaling comprises location information of the special acknowledgment field; and determine a target location of the special acknowledgment field in the HARQ acknowledgment feedback information based on the location information of the special acknowledgment field, and if information on the target location is invalid information, determine that the invalid information is in the special acknowledgment field.

* * * * *